United States Patent
Kang et al.

(10) Patent No.: US 10,133,152 B2
(45) Date of Patent: Nov. 20, 2018

(54) CAMERA MODULE AND CAMERA DEVICE

(71) Applicant: LG ELECTRONICS INC., Seoul (KR)

(72) Inventors: Hyungjoo Kang, Seoul (KR); Salkmann Ji, Seoul (KR); Samnyol Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/867,552

(22) Filed: Jan. 10, 2018

(65) Prior Publication Data

US 2018/0203328 A1  Jul. 19, 2018

(30) Foreign Application Priority Data

Jan. 19, 2017  (KR) .................. 10-2017-0009000

(51) Int. Cl.
  *G03B 13/36*  (2006.01)
  *G03B 17/00*  (2006.01)
  (Continued)

(52) U.S. Cl.
  CPC .............. *G03B 5/00* (2013.01); *G02B 7/09* (2013.01); *G03B 13/36* (2013.01); *H04N 5/2254* (2013.01);
  (Continued)

(58) Field of Classification Search
  None
  See application file for complete search history.

(56) References Cited

U.S. PATENT DOCUMENTS 9,632,327 B2 * 4/2017 Chan .................. G02B 13/009
9,804,477 B2 * 10/2017 Bang .................... G03B 13/36
(Continued)

FOREIGN PATENT DOCUMENTS

JP  2001344777  12/2001
JP  2008123585  5/2008
(Continued)

OTHER PUBLICATIONS

PCT International Application No. PCT/KR2018/000205, Notification of Transmittal of the International Search Report and the Written Opinion of the International Searching Authority, or Declaration dated Apr. 18, 2018, 9 pages.

*Primary Examiner* — W B Perkey
(74) *Attorney, Agent, or Firm* — Lee, Hong, Degerman, Kang & Waimey

(57) ABSTRACT

Disclosed is a camera module capable of overcoming a design limitation on a structure for auto-focusing and handshake compensation attributable to the thickness of the camera module provided in a small-sized camera device. The camera module includes a refractive unit including at least one lens, which has an optical axis oriented in a first direction, a lens case for supporting the refractive unit mounted thereto, a focusing-driving magnet secured to the lens case, a focusing-driving coil configured to accommodate at least a portion of the focusing-driving magnet inserted thereinto and to receive first current and generate driving force for allowing the focusing-driving magnet to perform first relative displacement in the first direction, a compensatory case configured to support the focusing-driving coil fixedly mounted thereto, and a focusing-sensing coil fixedly provided in the compensatory case and wherein second current is electromagnetically induced at the focusing-sensing coil by the first relative displacement.

15 Claims, 17 Drawing Sheets

(51) Int. Cl.
*H04N 5/225* (2006.01)
*H04N 5/232* (2006.01)
*G03B 5/00* (2006.01)
*G02B 7/09* (2006.01)

(52) U.S. Cl.
CPC ... *H04N 5/2328* (2013.01); *G03B 2205/0007* (2013.01); *G03B 2205/0069* (2013.01)

(56) References Cited

U.S. PATENT DOCUMENTS

| | | | |
|---|---|---|---|
| 2006/0285840 A1* | 12/2006 | Takahashi | G02B 27/646 396/55 |
| 2011/0181740 A1* | 7/2011 | Watanabe | G03B 3/10 348/208.2 |
| 2016/0258736 A1* | 9/2016 | Bachar | H04N 5/2254 |
| 2017/0108669 A1* | 4/2017 | Kim | G02B 15/177 |
| 2017/0160557 A1* | 6/2017 | Bang | G02B 27/646 |
| 2017/0324906 A1* | 11/2017 | Kang | G02B 7/28 |
| 2018/0024329 A1* | 1/2018 | Goldenberg | G02B 13/0065 |
| 2018/0095431 A1* | 4/2018 | Lee | G05B 11/01 |
| 2018/0136438 A1* | 5/2018 | Ho | G02B 7/1805 |
| 2018/0175758 A1* | 6/2018 | Chan | H02P 7/025 |

FOREIGN PATENT DOCUMENTS

| | | |
|---|---|---|
| KR | 100233050 | 9/1999 |
| KR | 1020060106416 | 10/2006 |
| KR | 100864691 | 10/2008 |

\* cited by examiner (a)

(b)

(a)

(b)

(a)

(b)

(c)

CAMERA MODULE AND CAMERA DEVICE

Pursuant to 35 U.S.C. § 119(a), this application claims the benefit of earlier filing date and right of priority to Korean Patent Application No. 10-2017-0009000 filed on Jan. 19, 2017, the contents of which are hereby incorporated by reference herein in its entirety.

BACKGROUND OF THE INVENTION

Field of the Invention

The present invention relates to a camera module, which performs a function of obtaining an image of a subject, and a camera device equipped with the camera module.

Discussion of the Related Art

When a user captures images using a device equipped with a camera without a separate support stand, there is a high possibility of the device shaking. The shaking of the device results in a distorted image of a subject or subjects.

Degradation of the image, that is, blur in the image, which occurs due to the shaking of the device equipped with the camera while photographing a subject, may be reduced by a handshake compensation device provided in the device equipped with the camera.

The handshake compensation device may be classified into a device using an optical image stabilization method and a device using an electronic image stabilization method according to the stabilization process.

According to the electronic image stabilization method, International Standard Organization (ISO) sensitivity is increased in order to capture an image in a high-sensitivity state, thereby minimizing image blur. Such an electronic image stabilization method is easily implemented using only a unit for adjusting the ISO sensitivity without the necessity for an additional mechanical device, leading to minimization of an increase in manufacturing costs.

However, the electronic image stabilization method may have defects attributable to the increase in the ISO sensitivity and may not become a fundamental solution because it does not prevent the shaking of the whole device.

The optical image stabilization method measures the shaking of the device and moves some components of the camera module based on the measured value. Therefore, even when the device shakes relative to a subject, the camera module is prevented from shaking or the shaking of the camera module is minimized.

A conventional optical image stabilization method is classified into a module tilt method for performing image stabilization through rotational movement of a lens and a lens shift method for performing image stabilization through translational movement of a lens.

A blur in the image attributable to the shaking of the device is more affected by rotational movement of the device than translational movement of the device. Therefore, the module tilt method has a better image stabilization effect than the lens shift method. However, the module tilt method has shortcomings in that the structure is complicated, the volume is large and manufacturing costs are high. Therefore, the lens shift method is widely used for a small-sized device.

A camera device may further include a device for performing auto-focusing.

Auto-focusing serves to adjust an effective focal length so that an image of a subject is formed clearly at an image sensor. An auto-focus actuator performs auto-focusing by moving a lens, like the optical image stabilization method.

The range within which the lens moves for the auto-focusing in the device is influenced by the magnification of the device. Therefore, as the magnification of the camera device is increased, the range within which the lens moves for the auto-focusing is required to be increased.

With the recent development of small-sized high-magnification devices, the movement range of a lens for an auto-focusing operation is increased. The increase in the movement range of a lens for an auto-focusing operation requires high measurement accuracy of a sensor for measuring the movement distance of a lens.

A conventional auto-focusing sensor is driven using a spring and a hall integrated circuit (IC). The auto-focusing sensor using the spring and the hall IC guarantees a certain degree of linearity when the movement range is relatively narrow. However, the linearity is not guaranteed when the movement range is relatively wide. Therefore, there is a need for other sensing configurations.

SUMMARY OF THE INVENTION

Accordingly, the present invention is directed to a camera module and a camera device that substantially obviate one or more problems due to limitations and disadvantages of the related art.

An object of the present invention is to overcome a design limitation on a structure for auto-focusing and handshake compensation attributable to the thickness of a camera module provided in a small-sized camera device.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a camera module includes a refractive unit including at least one lens, the lens having an optical axis oriented in a first direction, a lens case configured to support the refractive unit mounted thereto, a focusing-driving magnet secured to the lens case, a focusing-driving coil configured to accommodate at least a portion of the focusing-driving magnet inserted thereinto, the focusing-driving coil receiving first current and generating driving force for allowing the focusing-driving magnet to perform first relative displacement in the first direction, a compensatory case configured to support the focusing-driving coil fixedly mounted thereto, and a focusing-sensing coil fixedly provided in the compensatory case, wherein second current is electromagnetically induced at the focusing-sensing coil by the first relative displacement.

The camera module may further include a first steel plate having one end that is secured to the lens case, and a first insertion portion provided at an opposite end of the first steel plate in the first direction so as to be coupled to the focusing-driving magnet, at least a portion of the first insertion portion being inserted into the focusing-driving coil.

The focusing-driving coil and the focusing-sensing coil may be arranged in series with each other.

The camera module may further include a first magnetic portion provided in the lens case and the compensatory case in order to generate attractive force between the lens case and the compensatory case, and at least one bearing ball provided between the lens case and the compensatory case in order to support the lens case and the compensatory case.

The at least one bearing ball may include a plurality of bearing balls, and the camera module may further include a ball-seating portion formed concavely in a first surface of one of the lens case and the compensatory case in order to accommodate the plurality of bearing balls therein, and a support rib protruding from a second surface of a remaining one of the lens case and the compensatory case in order to support the bearing balls.

The support rib may have a V-shaped cross-section and may protrude toward the first surface.

The camera module may further include a first reflective unit configured to reflect light introduced thereinto in a second direction to the refractive unit, a translational-movement-driving magnet secured to the compensatory case, a translational-movement-driving coil configured to accommodate at least a portion of the translational-movement-driving magnet inserted thereinto, the translational-movement-driving coil receiving third current and generating driving force for allowing the translational-movement-driving magnet to perform second relative displacement in a third direction, a fixed case configured to support the translational-movement-driving coil fixedly mounted thereto, and a translational-movement-sensing coil fixedly provided in the fixed case, wherein fourth current is electromagnetically induced at the translational-movement-sensing coil by the second relative displacement. The third direction may be perpendicular to both the first direction and the second direction.

The camera module may further include a second magnetic portion provided at the fixed case, a third magnetic portion provided at the compensatory case to generate attractive force with the second magnetic portion, and at least one bearing ball provided between the compensatory case and the fixed case in order to support the compensatory case and the fixed case.

The camera module may further include a rotary portion fixedly provided at the fixed case and rotatably coupled to the first reflective unit, the rotary portion having a rotary axis oriented in the third direction, a rotation-driving magnet fixedly provided at the first reflective unit, and a rotation-driving coil provided at the fixed case so as to correspond to the rotation-driving magnet, the rotation-driving coil receiving fifth current and generating driving force for rotating the first reflective unit about the rotary axis of the rotary portion.

The camera module may further include a hall integrated circuit (IC) fixedly provided at the fixed case so as to correspond to the rotation-driving magnet, the hall IC generating sixth current by sensing an extent of rotation of the first reflective unit.

The first reflective unit may be a prism having a light-incident surface that is perpendicular to the second direction and a light-reflective surface for reflecting light, introduced in the second direction, in the first direction.

The camera module may further include a second reflective unit configured to reflect light, having passed through the refractive unit in the first direction, in a direction opposite the second direction, and an image sensor located at a position that is oriented from the second reflective unit in the direction opposite the second direction, the image sensor being arranged such that a sensing surface thereof is perpendicular to the second direction.

In another aspect of the present invention, a camera device includes a front surface and a rear surface arranged in a thickness direction and a camera module mounted thereto, and the camera module includes a refractive unit including at least one lens, the lens having an optical axis oriented in a first direction, a lens case configured to support the refractive unit mounted thereto, a focusing-driving magnet secured to the lens case, a focusing-driving coil configured to accommodate at least a portion of the focusing-driving magnet inserted thereinto, the focusing-driving coil receiving first current and generating driving force for allowing the focusing-driving magnet to perform first relative displacement in the first direction, a compensatory case configured to support the focusing-driving coil fixedly mounted thereto, a focusing-sensing coil fixedly provided in the compensatory case, wherein second current is electromagnetically induced at the focusing-sensing coil by the first relative displacement, a first reflective unit configured to reflect light introduced thereinto in a second direction to the refractive unit, a second reflective unit configured to reflect light, having passed through the refractive unit in the first direction, in a direction opposite the second direction, and an image sensor located at a position that is oriented from the second reflective unit in the direction opposite the second direction, the image sensor being arranged such that a sensing surface thereof is perpendicular to the second direction. The second direction is identical to the thickness direction of the camera device.

The camera module may further include a translational-movement-driving magnet secured to the compensatory case, a translational-movement-driving coil configured to accommodate at least a portion of the translational-movement-driving magnet inserted thereinto, the translational-movement-driving coil receiving third current and generating driving force for allowing the translational-movement-driving magnet to perform second relative displacement in a third direction, a fixed case configured to support the translational-movement-driving coil fixedly mounted thereto, and a translational-movement-sensing coil fixedly provided in the fixed case, wherein fourth current is electromagnetically induced at the translational-movement-sensing coil by the second relative displacement. The third direction may be perpendicular to both the first direction and the second direction. The camera device may further include a housing forming an external appearance of the camera device and configured to support the camera module such that the fixed case is fixed thereto, and a controller configured to apply the third current to the translational-movement-driving coil in response to shaking of the fixed case and a value of the fourth current.

The camera module may further include a rotary portion fixedly provided at the fixed case and rotatably coupled to the first reflective unit, the rotary portion having a rotary axis oriented in the third direction, a rotation-driving magnet fixedly provided at the first reflective unit, a rotation-driving coil provided at the fixed case so as to correspond to the rotation-driving magnet, the rotation-driving coil receiving fifth current and generating driving force for rotating the first reflective unit about the rotary axis of the rotary portion, and a hall integrated circuit (IC) fixedly provided at the fixed case so as to correspond to the rotation-driving magnet, the hall IC sensing an extent of rotation of the first reflective unit and generating sixth current. The controller may apply the fifth current to the rotation-driving coil in response to shaking of the fixed case and a sensing value of the hall IC.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1A:
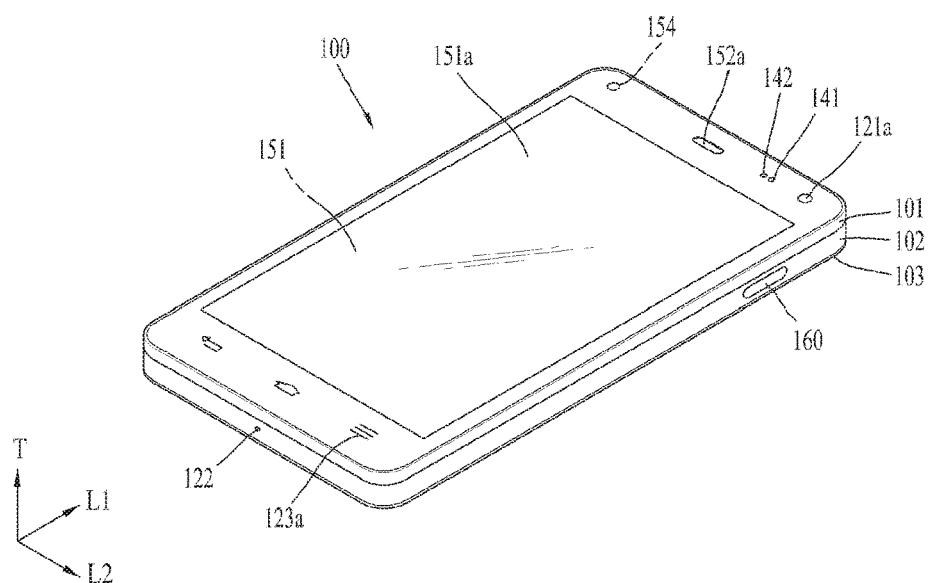
FIGS. 1a and 1b are a front perspective view and a rear perspective view of a camera device, respectively, according to the present invention.

Reference will now be made in detail to the preferred embodiments of the present invention, examples of which are illustrated in the accompanying drawings. Wherever possible, the same reference numbers will be used throughout the drawings to refer to the same or like parts.

When a user captures images using a device equipped with a camera without a separate support stand, there is a high possibility of the device shaking. The shaking of the device results in a distorted image of a subject or subjects.

Degradation of the image, that is, blur in the image, which occurs due to the shaking of the device equipped with the camera while photographing a subject, may be reduced by a handshake compensation device provided in the device equipped with the camera.

The handshake compensation device may be classified into a device using an optical image stabilization method and a device using an electronic image stabilization method according to the stabilization process.

According to the electronic image stabilization method, International Standard Organization (ISO) sensitivity is increased in order to capture an image in a high-sensitivity state, thereby minimizing image blur. Such an electronic image stabilization method is easily implemented using only a unit for adjusting the ISO sensitivity without the necessity for an additional mechanical device, leading to minimization of an increase in manufacturing costs.

However, the electronic image stabilization method may have defects attributable to the increase in the ISO sensitivity and may not become a fundamental solution because it does not prevent the shaking of the whole device.

The optical image stabilization method measures the shaking of the device and moves some components of the camera module based on the measured value. Therefore, even when the device shakes relative to a subject, the camera module is prevented from shaking or the shaking of the camera module is minimized.

A conventional optical image stabilization method is classified into a module tilt method for performing image stabilization through rotational movement of a lens and a lens shift method for performing image stabilization through translational movement of a lens.

A blur in the image attributable to the shaking of the device is more affected by rotational movement of the device than translational movement of the device. Therefore, the module tilt method has a better image stabilization effect than the lens shift method. However, the module tilt method has shortcomings in that the structure is complicated, the volume is large and manufacturing costs are high. Therefore, the lens shift method is widely used for a small-sized device.

A camera device may further include a device for performing auto-focusing.

Auto-focusing serves to adjust an effective focal length so that an image of a subject is formed clearly at an image sensor. An auto-focus actuator performs auto-focusing by moving a lens, like the optical image stabilization method.

The range within which the lens moves for the auto-focusing in the device is influenced by the magnification of the device. Therefore, as the magnification of the camera device is increased, the range within which the lens moves for the auto-focusing is required to be increased.

With the recent development of small-sized high-magnification devices, the movement range of a lens for an auto-focusing operation is increased. The increase in the movement range of a lens for an auto-focusing operation requires high measurement accuracy of a sensor for measuring the movement distance of a lens.

A conventional auto-focusing sensor is driven using a spring and a hall integrated circuit (IC). The auto-focusing sensor using the spring and the hall IC guarantees a certain degree of linearity when the movement range is relatively narrow. However, the linearity is not guaranteed when the movement range is relatively wide. Therefore, there is a need for other sensing configurations.

Figure 1B:
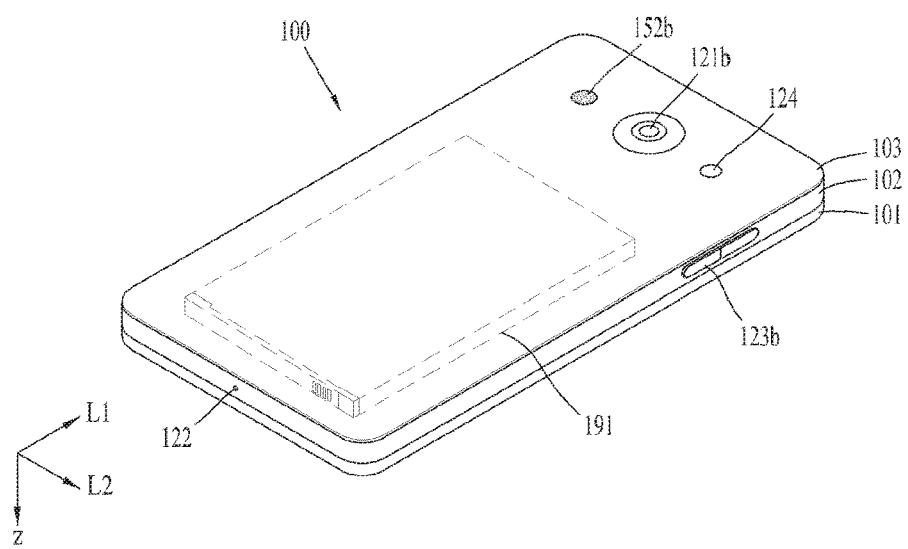

FIGS. 1a and 1b are a front perspective view and a rear perspective view of a camera device 100, respectively, according to the present invention.

As shown in FIGS. 1a and 1b, in the front surface of a body of the camera device 100 are provided a display unit 151, a first audio output unit 152a, a proximity sensor 141, an illuminance sensor 142, an optical output unit 154, a first camera 121a and a first manipulation unit 123a. In the lateral surface of the body of the camera device 100 are provided a second manipulation unit 123b, a microphone 122 and an interface unit 160. In the rear surface of the body of the camera device 100 are provided a second audio output unit 152b and a second camera 121b.

It is to be understood that alternative arrangements are possible. The above components may be omitted or replaced or may be arranged on other surfaces as needed. For example, the first manipulation unit 123a may not be located on the front surface of the body of the camera device 100, and the second audio output unit 152b may be located on the lateral surface of the body of the camera device 100, rather than on the rear surface of the body of the camera device 100.

The display unit 151 is configured to display (output) information processed in the camera device 100. For example, the display unit 151 may display execution screen information of an application program executing on the camera device 100 or user interface (UI) and graphic user interface (GUI) information in response to the execution screen information.

The display unit 151 may include at least one of a liquid crystal display (LCD), a thin film transistor-liquid crystal display (TFT-LCD), an organic light-emitting diode (OLED), a flexible display, a 3-dimensional (3D) display, or an e-ink display.

The display unit 151 may be implemented using two display devices in accordance with the configuration of the camera device 100. In this case, a plurality of the display units may be arranged on one side of the camera device 100 while being spaced apart from each other or being integrated, or may be arranged on different surfaces.

The display unit 151 may also include a touch sensor that senses a touch input performed on the display unit 151 so as to receive a control command in a touch manner. When touch input is made on the display unit 151, the touch sensor may sense this touch, and the controller 180 may generate a control command corresponding to the touch. The content that is input in the touching manner may be a text or numerical value, or may be a menu item that can be indicated or designated in various modes.

The touch sensor may be configured in the form of a film having a touch pattern, which is disposed between the window 151a and a display (not shown) on the rear surface of the window 151a, or in the form of a metal wire, which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as a user input unit. Depending on the circumstances, the touch screen may replace some or all of the functions of the first manipulation unit 123a.

The first audio output unit 152a may be implemented in the form of a receiver for transferring call sounds to a user's ear, and the second audio output unit 152b may be implemented in the form of a loudspeaker to output alarm sounds, multimedia audio reproduction, and the like.

The window 151a of the display unit 151 may include an aperture to permit a sound generated by the first audio output unit 152a to pass. However, the disclosure is not limited thereto. Configuration may be made such that the sound is released along an assembly gap between the structural bodies (for example, a gap between the window 151a and the front case 101). In this case, a hole independently formed to output audio sounds may not be seen, or may otherwise be hidden from view, thereby further simplifying the appearance of the camera device 100.

The optical output unit 154 is configured to output light for indicating occurrence of an event. Examples of such events include receipt of a message, receipt of a call signal, a missed call, an alarm, a schedule notice, receipt of an email, receipt of information through an application, and the like. Upon determining that a user has checked a generated event, the controller 180 may control the optical output unit 154 to stop the light output.

The first camera 121a may process image frames of still or moving images obtained by the image sensor in an image capture mode or a video call mode. The processed image frames may then be displayed on the display unit 151 or stored in the memory 170.

A camera module 200, which will be described later, may be a physical embodiment of the first camera 121a or the second camera 121b.

The camera module 200 may conceptually be thought of as a single part provided in the camera device 100.

The first and second manipulation units 123a and 123b may be examples of the user input unit 123, which is manipulated by a user to receive a command for controlling the operation of the camera device 100, and may also be commonly referred to as a manipulation portion. The first and second manipulation units 123a and 123b may employ any tactile method that allows the user to perform manipulation such as touch, push, scroll, or the like while providing a tactile sensation to the user. The first and second manipulation units 123a and 123b may also employ any non-tactile method that allows the user to perform manipulation such as proximity touch, hovering, or the like without providing a tactile sensation to the user.

The first manipulation unit 123a is illustrated in the drawing as being implemented as a touch key; however, the disclosure is not limited thereto. For example, the first manipulation unit 123a may be implemented as a push key (a mechanical key) or a combination of the touch key and the push key.

Inputs received at the first and second manipulation units 123a and 123b may be set variously. For example, the first manipulation unit 123a may be configured to receive commands related to a menu, home key, cancel, search, or the like, and the second manipulation unit 123b may be configured to receive commands related to control of a volume level of the sound output from the first or second audio output unit 152a or 152b, conversion into a touch recognition mode of the display unit 151, or the like.

As another example of the user input unit 123, a rear input unit (not shown) may be located on the rear surface of the body of the camera device 100. The rear input unit may be manipulated by a user to receive a command for controlling the operation of the camera device 100. Input received at the rear input unit may be set variously. For example, the rear input unit may be configured to receive commands related to power on/off, start, end, scroll, control of a volume level of the sound output from the first or second audio output unit 152a or 152b, conversion into a touch recognition mode of the display unit 151, or the like. The rear input unit may be configured to permit a touch input, a push input, or a combination thereof.

The rear input unit may be located to overlap the display unit 151 located on the front surface in the thickness direction of the body of the camera device 100. As one example, the rear input unit may be located on an upper end portion of the rear surface of the body of the camera device 100 such that a user can easily manipulate the camera device 100 using a forefinger when the user grabs the body of the camera device 100 with one hand. However, the disclosure is not limited thereto, and the location of the rear input unit may be changed.

In the case in which the rear input unit is located on the rear surface of the body of the camera device 100, a new type of user interface using the same may be implemented. Further, the aforementioned touch screen or the rear input unit may replace some or all of the functions of the first manipulation unit 123a located on the front surface of the body of the camera device 100. Therefore, in the case in which the first manipulation unit 123a is omitted from the front surface of the body of the camera device 100, the display unit 151 may have a larger screen.

The camera device 100 may further include a finger scan sensor that scans a user's fingerprint. The controller 180 may use fingerprint information sensed by the finger scan sensor as part of an authentication procedure. The finger scan sensor may be installed in the display unit 151 or the user input unit 123.

The microphone 122 is configured to receive a user's voice and other sounds. The microphone 122 may be provided in a plural number at multiple positions so as to receive stereo sounds.

The interface unit 160 may serve as a path via which the camera device 100 is connected to external devices. For example, the interface unit 160 may include at least one of a connection terminal for connecting to another device (for example, an earphone, an external speaker, or the like), a port for near-field communication (for example, an Infrared Data Association (IrDA) port, a Bluetooth port, a wireless LAN port, and the like), or a power supply terminal for supplying power to the camera device 100. The interface unit 160 may be implemented in the form of a socket for accommodating an external card, such as a Subscriber Identification Module (SIM), a User Identity Module (UIM), or a memory card for information storage.

The second camera 121b may be located on the rear surface of the body of the camera device 100. In this case, the direction in which the second camera 121b captures an image is substantially opposite the direction in which the first camera 121a captures an image.

The second camera 121b may also be an embodiment of the camera module 200, which will be described later.

The second camera 121b may include a plurality of lenses arranged along at least one line. The lenses may also be arranged in a matrix configuration. This camera may be referred to as an "array camera". When the second camera 121b is implemented as an array camera, images may be captured in various manners using the lenses, and images having better quality may be obtained.

A flash 124 may be disposed adjacent to the second camera 121b. When an image of a subject is captured by the second camera 121b, the flash 124 illuminates the subject.

The second audio output unit 152b may be additionally located on the body of the camera device 100. The second audio output unit 152b may implement stereophonic sound functions together with the first audio output unit 152a, and may also be used for implementing a speaker-phone mode for call communication.

At least one antenna for wireless communication may be located on the body of the camera device 100. The antenna may be installed in the body of the camera device 100, or may be formed at the case. For example, the antenna, which constitutes a part of the broadcast receiving module, may be configured so as to be withdrawn from the body of the camera device 100. Alternatively, the antenna may be of a film type that is attached to the inner surface of the rear cover 103, or a case including a conductive material may be configured to serve as the antenna.

A power supply unit 190 for supplying power to the camera device 100 including the camera module 200 may be disposed at the body of the camera device 100. The power supply unit 190 may include a battery 191, which is mounted in the body of the camera device 100 or detachably coupled to the exterior of the body of the camera device 100.

The battery 191 may be configured to receive power via a power cable connected to the interface unit 160. The battery 191 may be configured to be recharged in a wireless manner using a wireless charger. Wireless charging may be implemented by a magnetic-induction method or a resonance (magnetic-resonance) method.

As shown in the drawing, the rear cover 103 is coupled to the rear case 102 so as to cover the battery 191, thereby preventing separation of the battery 191 and protecting the battery 191 from external shocks and foreign substances. In the case in which the battery 191 is detachably mounted to the body of the camera device 100, the rear cover 103 may be detachably coupled to the rear case 102.

Figure 2:
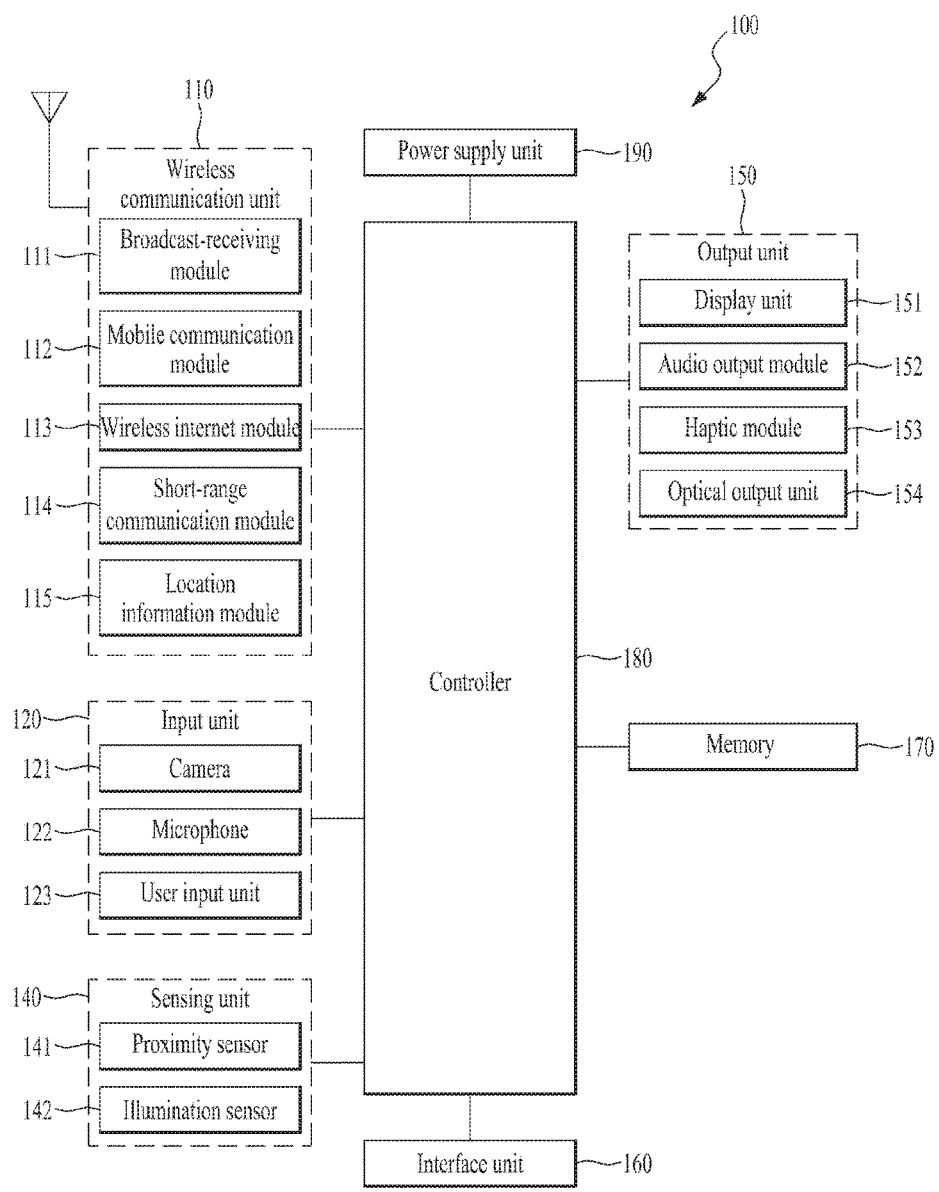
FIG. 2 is a block diagram of the camera device according to the present invention.

FIG. 2 is a block diagram of the camera device 100 according to the present invention.

Examples of the camera device 100 set forth herein may include cellular phones, smart phones, laptop computers, digital broadcast terminals, personal digital assistants (PDAs), portable multimedia players (PMPs), navigators, slate PCs, tablet PCs, ultrabooks, wearable devices (for example, smart watches, smart glasses, head-mounted displays (HMDs)), and the like.

By way of non-limiting example only, further description will be made with reference to particular types of mobile terminals. However, it will be apparent to those skilled in the art that the configuration of the embodiment of the present invention can also be applied to stationary terminals such as digital TVs, desktop computers, digital signage, and the like.

The camera device 100 may include a wireless communication unit 110, an input unit 120, a sensing unit 140, an output unit 150, an interface unit 160, a memory 170, a controller 180, and a power supply unit 190. The components illustrated in FIG. 2 are not necessarily required in order to implement the camera device 100. Therefore, the camera device 100 set forth herein may include a greater or fewer number of components than the aforementioned components.

For example, among the aforementioned components, the wireless communication unit 110 may include one or more modules that permit wireless communication between the camera device 100 and a wireless communication system, wireless communication between the camera device 100 and another terminal, or wireless communication between the camera device 100 and an external server. Further, the wireless communication unit 110 may include one or more modules that connect the camera device 100 to one or more networks.

The wireless communication unit 110 may include at least one of a broadcast-receiving module 111, a mobile communication module 112, a wireless internet module 113, a short-range communication module 114, or a location information module 115.

The input unit 120 may include a camera 121 or an image input unit for inputting an image signal, a microphone 122 or an audio input unit for inputting an audio signal, and a user input unit 123 (for example, a touch key, a push key (a mechanical key), and the like) for allowing a user to input information. Audio data or image data obtained by the input unit 120 may be analyzed and processed and thus converted into user control commands.

The sensing unit 140 may include one or more sensors configured to sense at least one of internal information of the camera device 100, information about the environment surrounding the camera device 100, or user information. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, a camera 121), a microphone 122, a battery gauge, an environment sensor (for example, a barometer, a hygrometer, a thermometer, a radiation detection sensor, a thermal sensor, a gas sensor, and the like), or a chemical sensor (for example, an electronic nose, a health care sensor, a biometric sensor, and the like). The camera device 100 set forth herein may be configured to utilize combinations of information obtained from two or more sensors of the sensing unit 140.

A sensing coil, which will be described later, may also be one component of the sensing unit 140.

The output unit 150 is configured to generate sensory output in a visual, acoustic or haptic form. The output unit 150 may include at least one of a display unit 151, an audio output unit 152, a haptic module 153, or an optical output unit 154. The display unit 151 may have a layered structure or a structure that is integrated with a touch sensor in order to realize a touch screen. The touch screen may provide an output interface between the camera device 100 and a user, as well as function as the user input unit 123 that provides an input interface between the camera device 100 and the user.

The interface unit 160 serves as an interface with various types of external devices that can be connected to the camera device 100. The interface unit 160 may include at least one of a wired/wireless headset port, an external charger port, a wired/wireless data port, a memory card port, a port for connecting a device having an identification module, an audio input/output (I/O) port, a video I/O port, or an earphone port. The camera device 100 may perform appropriate control associated with an external device connected to the interface unit 160.

The memory 170 is configured to store data to support various functions of the camera device 100. The memory 170 may store application programs (or applications), which are executed in the camera device 100, data or instructions for operation of the camera device 100, and the like. Some of these applications may be downloaded from an external server via wireless communication. Other applications may be installed within the camera device 100 at the time of manufacturing or shipping, which is typically the case for basic functions of the camera device 100 (for example, receiving a call, placing a call, receiving a message, sending a message, and the like). Applications may be stored in the memory 170, installed in the camera device 100, and executed by the controller 180 to perform an operation (or a function) of the camera device 100.

The controller 180 typically functions to control the overall operation of the camera device 100, in addition to the operations associated with the applications. The controller 180 may provide or process information or functions suitable for a user by processing signals, data, information and the like, which are input or output by the aforementioned components, or by activating applications stored in the memory 170.

Further, the controller 180 may control some or all of the components illustrated in FIG. 2 in order to execute applications stored in the memory 170. Furthermore, the controller 180 may combine two or more components included in the camera device 100 and drive the same in order to execute the applications.

The power supply unit 190 is configured to receive external power or internal power and to supply power to the components included in the camera device 100 under the control of the controller 180. The power supply unit 190 may include a battery, and the battery may be configured to be embedded in the body of the camera device 100, or may be configured to be detachable from the body of the camera device 100.

Some or all of the above components may operate in cooperation with one another in order to implement the operation, the control or the control method of the camera device 100 according to the various embodiments described below. The operation, the control or the control method of the camera device 100 may be implemented by the execution of at least one application stored in the memory 170.

Hereinafter, the principle and the processes of implementing image stabilization associated with the camera device 100 or the camera module 200 will be described.

Figure 3:
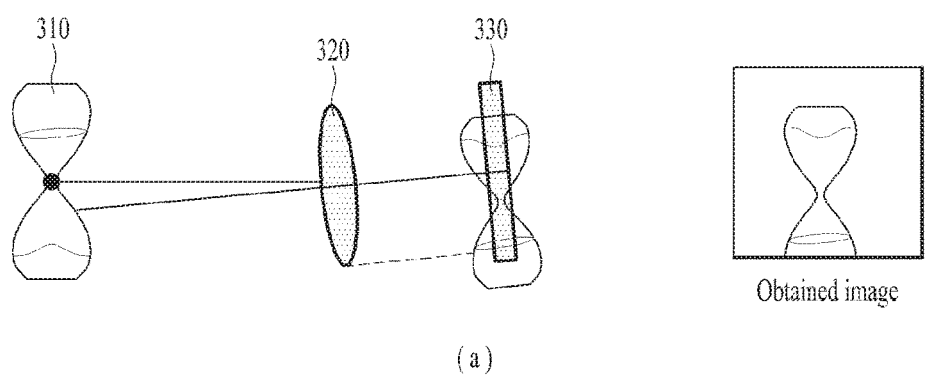
FIG. 3 is a mimetic diagram showing image stabilization according to a conventional lens shift method.
Figure 3:
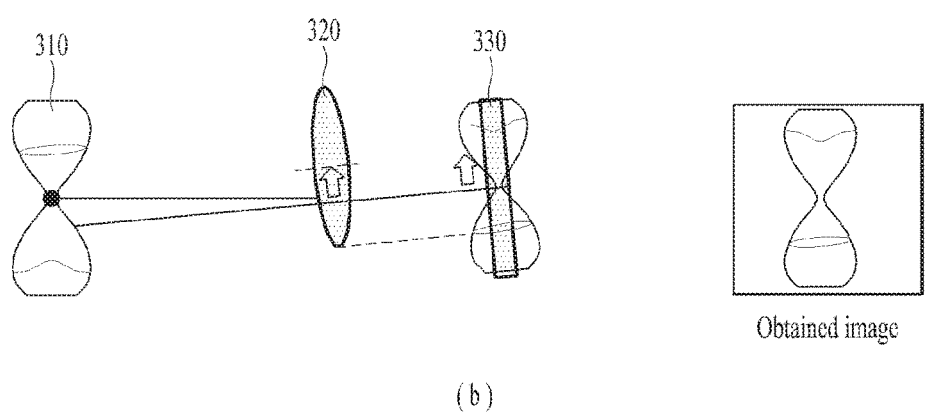

FIG. 3 is a mimetic diagram showing image stabilization according to a conventional lens shift method.

The camera mounted to the device receives light reflected from a subject 310 through a lens 320, and the lens 320 reflects or transmits the received light and outputs the light to an image sensor 330. An image of the light output from the lens 320 is formed at the image sensor 330, and consequently, a final image is obtained.

Because the lens 320 of the camera is fixed to the device, the subject 310, which the lens 320 of the camera views, that is, an image of which is obtained, varies in accordance with movement of the device, including shaking thereof.

The lens shift method compensates for the shaking of the device via translational movement of the lens 320.

FIG. 3a illustrates the state before the lens 320 performs translational movement with respect to the shaking of the device, and FIG. 3b illustrates the state after the lens 320 performs translational movement with respect to the shaking of the device.

Light of an object passes through the lens 320 and forms an inverted real image at the image sensor 330. The image sensor 330 obtains the formed inverted real image and converts the same into the form of an electronic signal.

As shown in FIG. 3a, when the camera device, which was focused on the center of the fixed object, shakes and is thus biased toward a lower portion of the object, the image sensor 330 of the camera cannot obtain an image of the upper end portion of the object.

In order to compensate for this bias, as shown in FIG. 3b, the lens 320 performs translational movement in the vertically upward direction so as to obtain the image of the upper end portion of the object. This method of moving the lens 320 is the lens shift method.

That is, the compensation process is performed by moving the lens 320 in one direction perpendicular to the optical axis of the lens 320.

However, as described above, degradation of the image is more affected by rotational shaking of the device than translational shaking of the device.

The lens shift method compensates for the rotational shaking of the device via translational movement, whereby the center portion of the obtained image can be stabilized to a certain level or higher. However, the marginal portion of the obtained image is blurred or distorted due to variation in the magnification attributable to variation in the distance between the outermost lens and the shifted lens 320.

The module tilt method makes up for this shortcoming of the lens shift method. The rotational shaking of the device is compensated for by tilting of the lens 320, that is, rotation of the lens 320, whereby distortion of an image in the module tilt method is less than in the lens shift method.

However, the module tilt method has shortcomings in that the structure of a driving unit for tilting of the lens 320 is complicated and manufacturing costs are high, and thus it is not suitable for small-sized devices.

FIG. 4a is a schematic view illustrating the cross section of a conventional camera device 100, and FIG. 4b is a schematic view illustrating the cross section of the camera device 100 of the present invention.

In the case in which the camera device 100 is implemented as a common mobile terminal, the camera is typically configured such that an aperture or a cover window 221 of the device is oriented toward a front surface or a rear surface of the camera device 100 in the thickness direction thereof (in the direction T in FIG. 4) so as to capture an image of the subject in the thickness direction.

Unless a separate component is added, the optical axis is oriented toward the subject, and therefore the lens of the camera is arranged in the direction T of the camera device 100, as shown in FIG. 4a.

The camera module 200 occupies a large space in the optical-axis direction. As shown in FIG. 4a, in the case in which the camera module 200 is arranged in the narrow space of the camera device 100 in the thickness direction thereof, there is a limitation on the design of the lens of the camera module 200.

Figure 4:
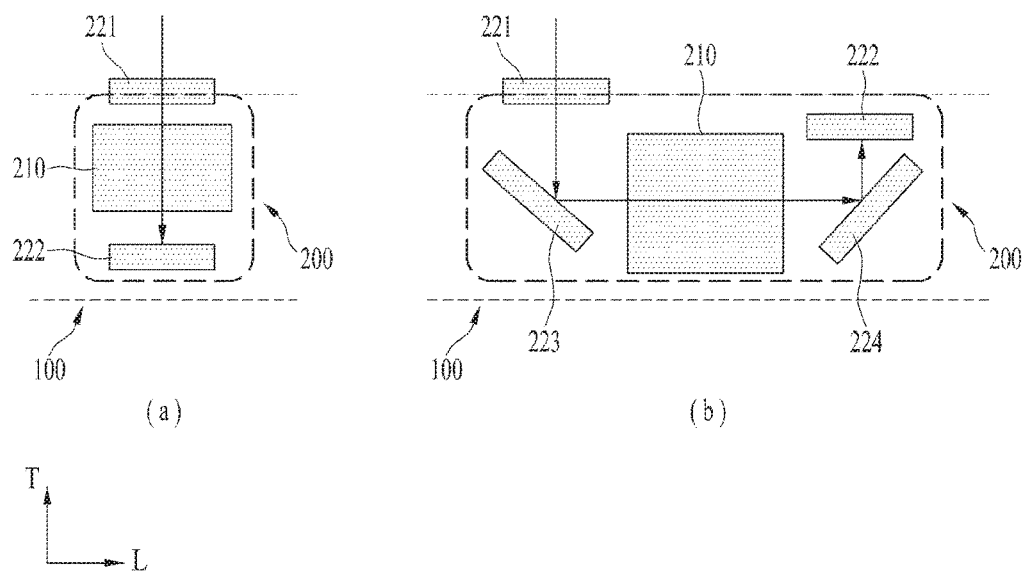
FIG. 4 is a schematic view illustrating the cross section of a camera device.

In order to make up for this shortcoming, as shown in FIG. 4b, the present invention provides a periscope-type camera module 200 in which the optical axis of the lens is oriented in the longitudinal direction of the camera device 100 (in the direction L in FIG. 4), rather than in the thickness direction of the camera device 100, using a reflective unit.

The optical axis of a refractive unit 210 is oriented in the longitudinal direction of the device. Therefore, the freedom of design in the optical-axis direction of the refractive unit 210 is increased, thereby overcoming the limitation on the zoom or auto-focusing function.

Here, the refractive unit 210 may be implemented as one lens or a plurality of lenses that have the same optical axis as each other.

An image sensor 222 of the camera module 200, at which an image of a subject is formed, or a substrate, to which the image sensor 222 is mounted, is formed to have a small thickness and a large width. Therefore, the image sensor 222 may be arranged such that the surface of the image sensor 222 is oriented perpendicular to the thickness direction of the camera device 100, as shown in FIG. 4b.

Light reflected from the subject passes through the cover window 221 of the camera device 100, is reflected by a first reflective unit 223, passes through the refractive unit 210, the optical axis of which is oriented in the longitudinal direction of the camera device 100, is reflected by a second reflective unit 224, and is transferred to the image sensor 222, whereby an image of the subject is formed at the image sensor 222.

The present invention compensates for shaking of the device via the optical image stabilization method using two driving mechanisms.

One of the driving mechanisms is implemented by rotational movement of the first reflective unit 223, and the other one of the driving mechanisms is implemented by translational movement of the refractive unit 210.

The image stabilization principles using the respective driving mechanisms will be described.

Figure 5:
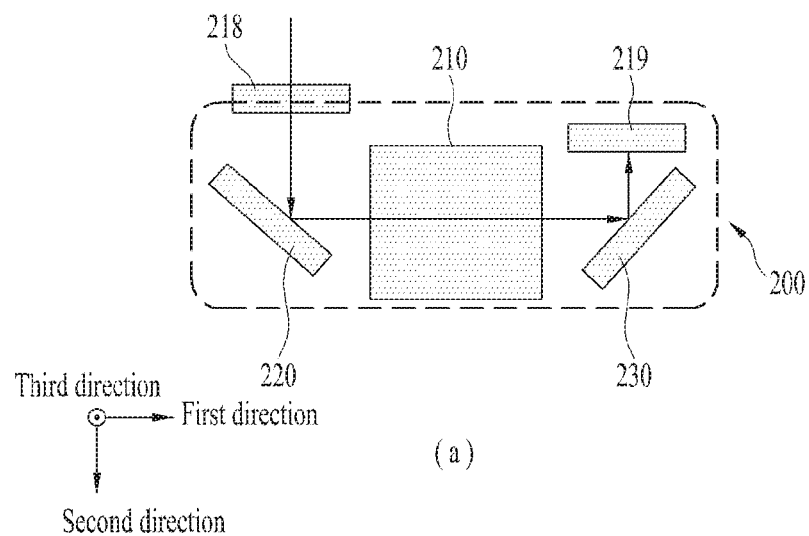
FIG. 5 is a schematic side view of a camera module according to the present invention.
Figure 5:
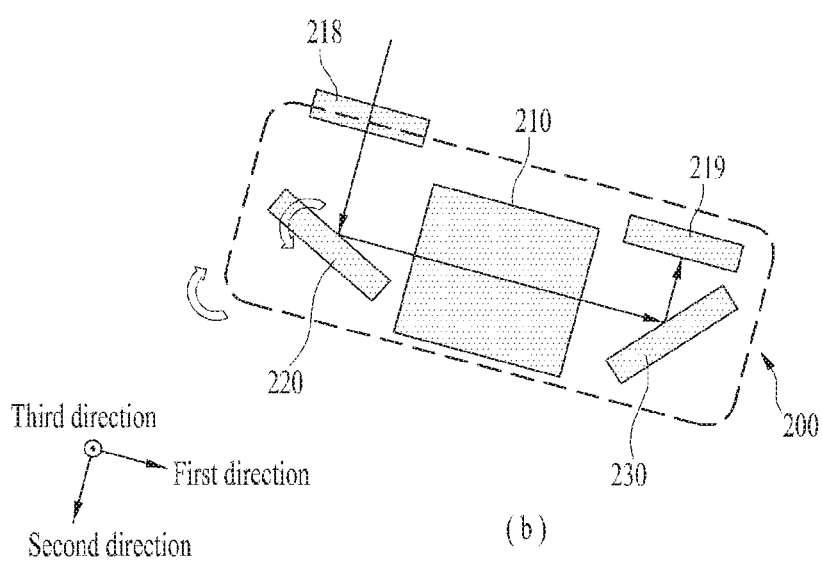

FIG. 5 is a schematic side view of the camera module 200 according to the present invention.

On the assumption that the camera module 200 is a periscope-type camera module, some components related to shaking of the camera module 200 may be compensated for by the rotational movement of the first reflective unit 223.

FIG. 5a illustrates the non-shaking state of the device, and FIG. 5b illustrates the shaking state of the device.

For convenience of explanation, the directions will be defined with respect to the camera module 200.

The direction of an optical axis 2101 of the refractive unit 210 is defined as a first direction. The direction in which light is introduced into the first reflective unit 223 is defined as a second direction. That is, the first reflective unit 223 reflects light, which is introduced thereinto in the second direction, in the first direction. Before the first reflective unit 223 performs rotational movement for compensation of shaking, the first direction and the second direction are perpendicular to each other. That is, the perpendicular state between the first direction and the second direction is a non-shaking state of the device, i.e. a non-rotating state of the first reflective unit 223.

A direction perpendicular to both the first direction and the second direction is defined as a third direction.

A plane, which includes the first direction and the second direction, is defined as a first plane.

The first reflective unit 223 performs rotational movement about a rotary axis that is oriented perpendicular to the first plane.

The rotational movement of the first reflective unit 223 has an effect of compensating for rotational shaking that occurs about a rotary axis that is oriented parallel to the third direction in the camera module 200.

For example, as shown in FIG. 5b, when the camera module 200 shakes in the manner of rotating clockwise in the first plane, the first reflective unit 223 may compensate for the shaking by rotating counterclockwise in the first plane.

However, because the above-described rotational compensation of the first reflective unit 223 is limited to rotation in the first plane, it is not possible to compensate for shaking in all directions of the camera module 200.

Figure 6:
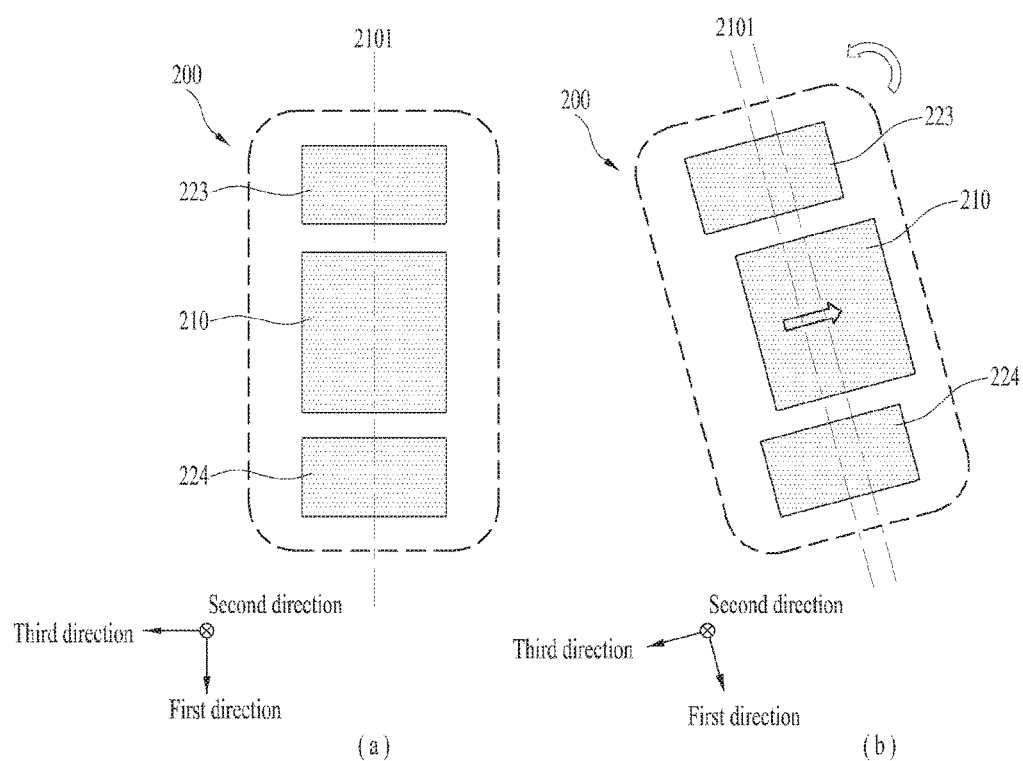
FIG. 6 is a schematic top view of the camera module according to the present invention.

FIG. 6 is a schematic top view of the camera module 200 according to the present invention.

Components related to the shaking of the camera module 200 that the first reflective unit 223 cannot compensate for are compensated for by translational movement of the refractive unit 210.

The refractive unit 210 performs translational movement in the third direction, which is perpendicular to the first plane, in which the first reflective unit 223 performs rotational movement.

This translational movement may be implemented via a principle similar to that of the above-described lens shift method shown in FIG. 3.

The refractive unit 210 performs translational movement in a direction perpendicular to the optical axis 2101. This translational movement of the refractive unit 210 compensates for rotation of the device occurring in the plane that includes the optical axis 2101 and in which the translational movement occurs.

For example, when the device shakes in the manner of rotating counterclockwise in the second plane, which includes the first direction and the third direction, the refractive unit 210 may perform translational movement in the direction opposite the direction in which the optical axis 2101 moves away from the object due to the rotational shaking in the counterclockwise direction. At this time, the translational movement may be performed perpendicular to the optical axis 2101.

Three-dimensional rotational shaking of the camera module 200 may be expressed by rotation of the camera module 200 in the first plane and rotation of the camera module 200 in the second plane. Therefore, it is possible to compensate for the three-dimensional rotational shaking of the camera module 200 via the rotational movement of the first reflective unit 223 and the translational movement of the refractive unit 210.

Figure 7:
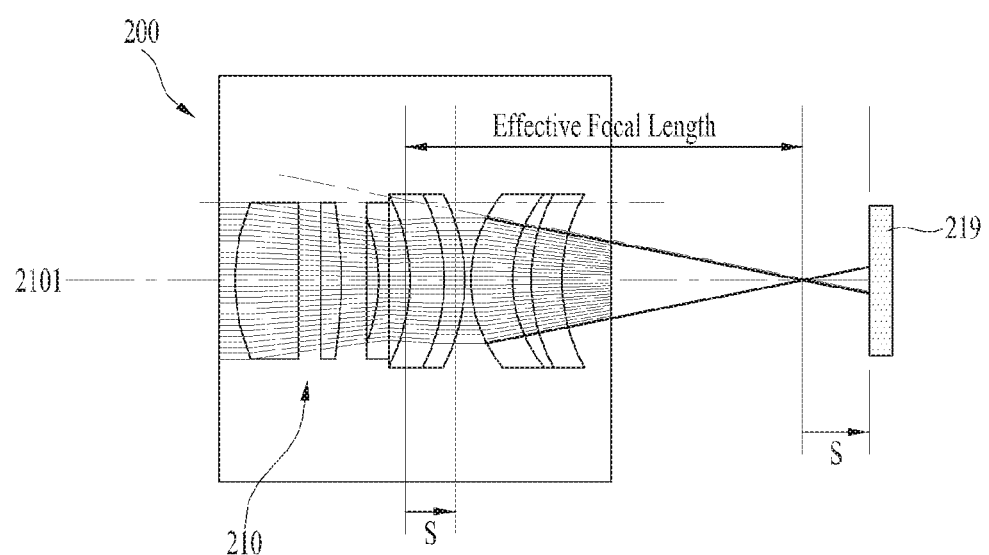
FIG. 7 is a schematic side view of the camera module according to the present invention.

FIG. 7 is a schematic side view of the camera module 200 according to the present invention.

Auto-focusing operation serves to adjust an effective focal length of the refractive unit 210 so that a focus location is positioned at the image sensor 222, thereby forming a clear image.

In the refractive unit 210 including a plurality of lenses, the effective focal length is a distance from the optical center of the refractive unit 210 to the focal point.

The focus location of the effective focal length may be positioned at the image sensor 222 via translational movement of the refractive unit 210 in the direction of the optical axis 2101. For example, when the focus location of the effective focal length of the refractive unit 210 is spaced a distance S apart from the image sensor 222, the refractive unit 210 is moved the distance S so that the focus location of the effective focal length is positioned at the image sensor 222.

The camera module 200 of the present invention may perform the above-described operations shown in FIGS. 5 to 7 in combination. That is, rotational movement of the first reflective unit 223 or translational movement of the refractive unit 210 in the direction perpendicular to the optical axis 2101 is performed for optical image stabilization, and translational movement of the refractive unit 210 in the direction of the optical axis 2101 is performed for auto-focusing.

The direction in which the refractive unit 210 performs translational movement for shaking compensation and the direction in which the refractive unit 210 performs translational movement for auto-focusing need to be perpendicular to each other so as to avoid having a negative influence on each other.

Hereinafter, the aforementioned three types of movement in the camera device 100 of the present invention will be described in detail.

Figure 8:
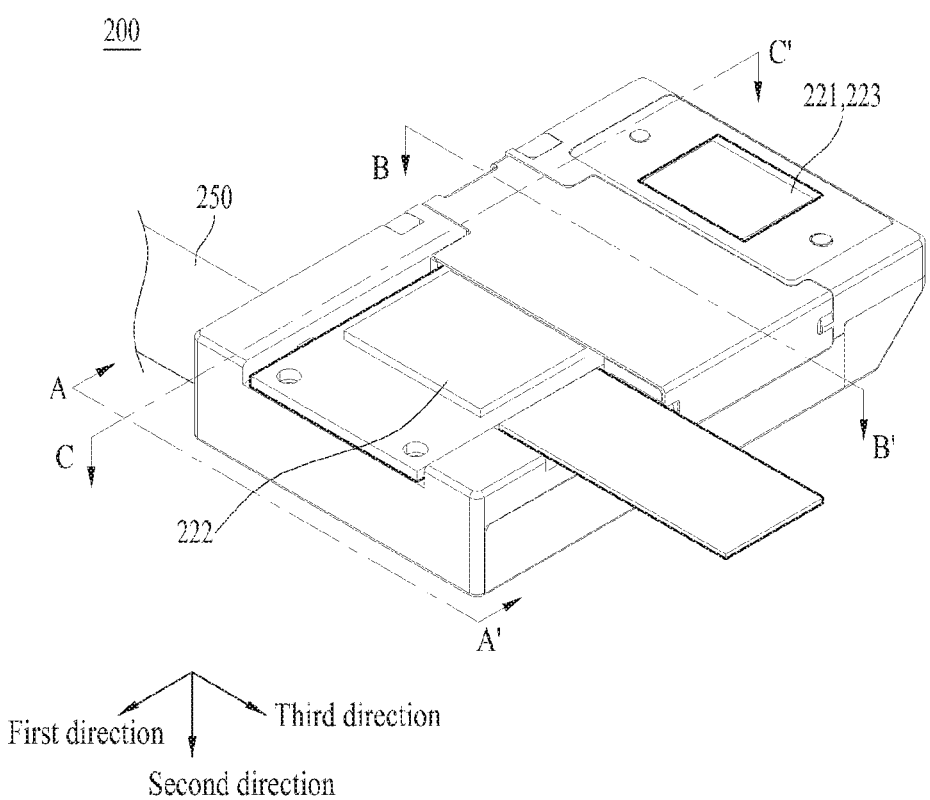
FIG. 8 is a top perspective view of the camera module according to the present invention.

FIG. 8 is a top perspective view of the camera module 200 according to the present invention.

The periscope-type camera module 200 may have the configuration illustrated in FIG. 8. However, the disclosure is not limited thereto. Various changes in form and details may be made without departing from the essential characteristics of the present invention.

The camera module 200 may be mounted to the aforementioned camera device 100 and may directly perform an image-capturing function of the camera device 100. The camera module 200 set forth herein is configured as a unitary module in which the respective components thereof perform their functions, which will be described later; however, it is not necessarily configured as a unitary module.

The camera module 200 may include a flexible printed circuit board (PCB) so as to be electrically connected to a main PCB, to which the controller 180 (refer to FIG. 2) of the camera device 100 is mounted.

The camera module 200 may have a relatively small thickness in the second direction. Therefore, as described above, the camera device 100 and the camera module 200 may be aligned with each other in the thickness direction.

Figure 9:
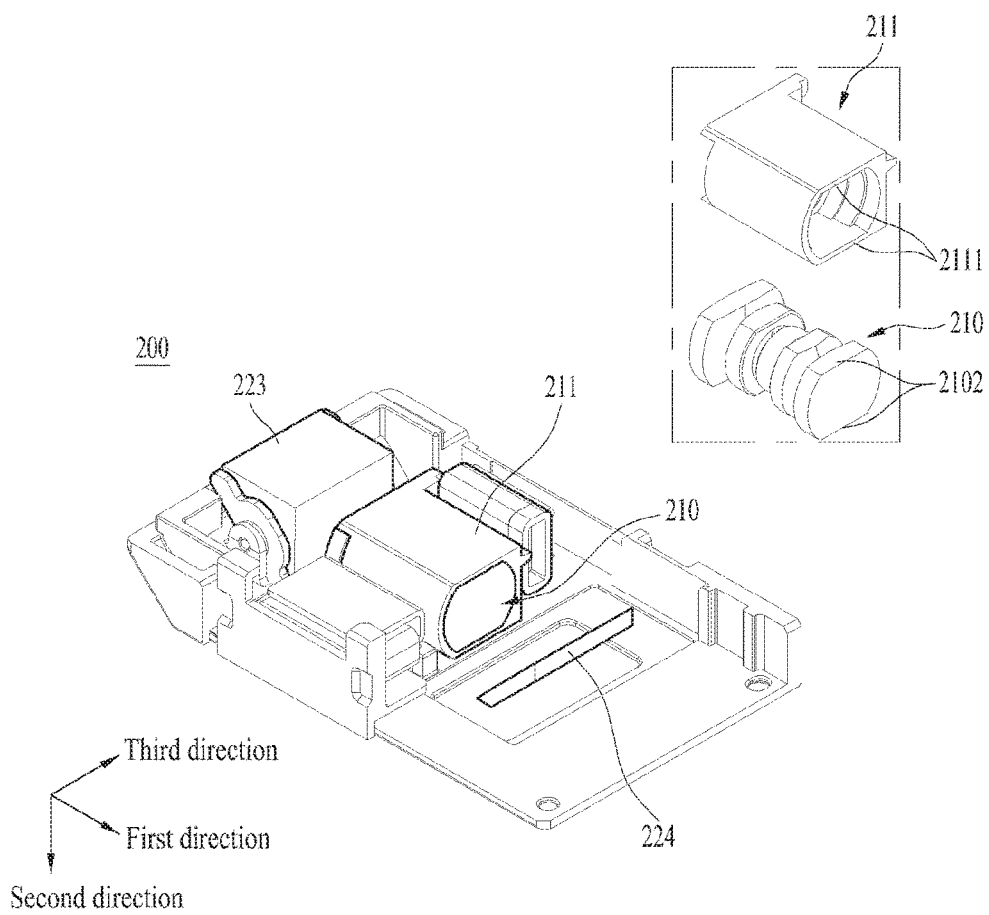
FIG. 9 is a partial top perspective view of the camera module according to the present invention.

FIG. 9 is a partial top perspective view of the camera module 200 according to the present invention.

As described above, light reflected from the subject is introduced into the first reflective unit 223. The first reflective unit 223 reflects the light introduced thereto to the refractive unit 210.

The first reflective unit 223 needs to reflect light introduced thereinto without influencing refraction of the light. However, the first reflective unit 223 may serve as a reflective lens that influences refraction of light to a certain extent in order to satisfy optical design requirements.

The first reflective unit 223 may take the form of a prism. In the case in which the first reflective unit 223 takes the form of a prism, the light-incident surface of the prism may be replaced by the aforementioned cover window 221. At this time, the light-incident surface may be perpendicular to the second direction. The light-reflective surface of the prism reflects light, which is introduced into the prism in the second direction, in the first direction.

The light that has passed through the refractive unit 210 is reflected to the image sensor 222 by the second reflective unit 224, and consequently an image is formed at the image sensor 222.

The refractive unit 210 is mounted to a lens case 211. Therefore, the movement of the refractive unit 210 is dependent on the movement of the lens case 211. All of the lenses of the refractive unit 210 may move the same distance in accordance with the movement of the lens case 211.

However, a plurality of lens groups may be provided, and the distances between the respective lens groups may vary for zoom operation. This zoom operation may be performed independently in the lens case 211.

Each of the lenses may be formed in the shape of a circle that includes two chord regions 2102, which are arranged in the second direction and are formed by cutting out two opposite segments. The lens case 211 may be formed in a shape that corresponds to the circular-shaped lenses including the chord regions 2102. Therefore, the lens case 211 may also include an upper flat surface and a lower flat surface.

The circular shapes of the refractive unit 210 and the lens case 211, from which the upper portions and the lower portions thereof are cut out, make it possible to minimize the respective thicknesses of the refractive unit 210 and the lens case 211 in the vertical direction. Therefore, an increase in the thickness of the entire camera module 200 in the vertical direction is minimized.

In addition, the circular shape, from which two opposite segments are cut out, serves to fix the lenses so as to prevent the lenses from undesirably moving, for example, rotating, within the lens case 211.

The lens case 211 is configured to move in the first direction relative to a compensatory case 231, thereby allowing the refractive unit 210 to perform translational movement in the first direction for auto-focusing.

Figure 10:
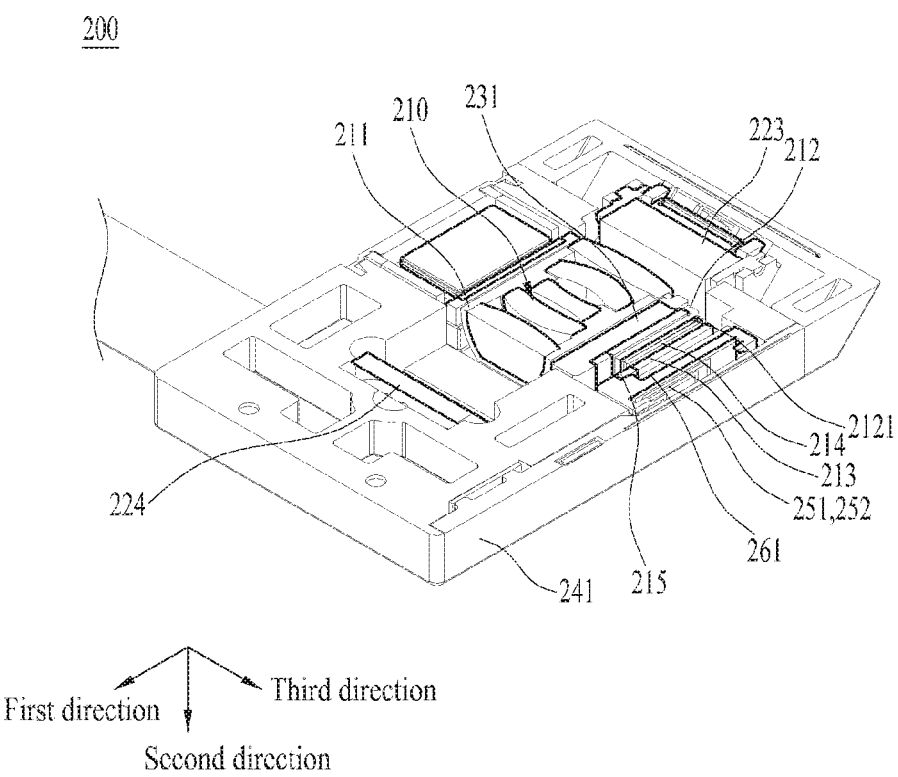
FIG. 10 is a cross-sectional view taken along line A-A' in FIG. 8.
Figure 11:
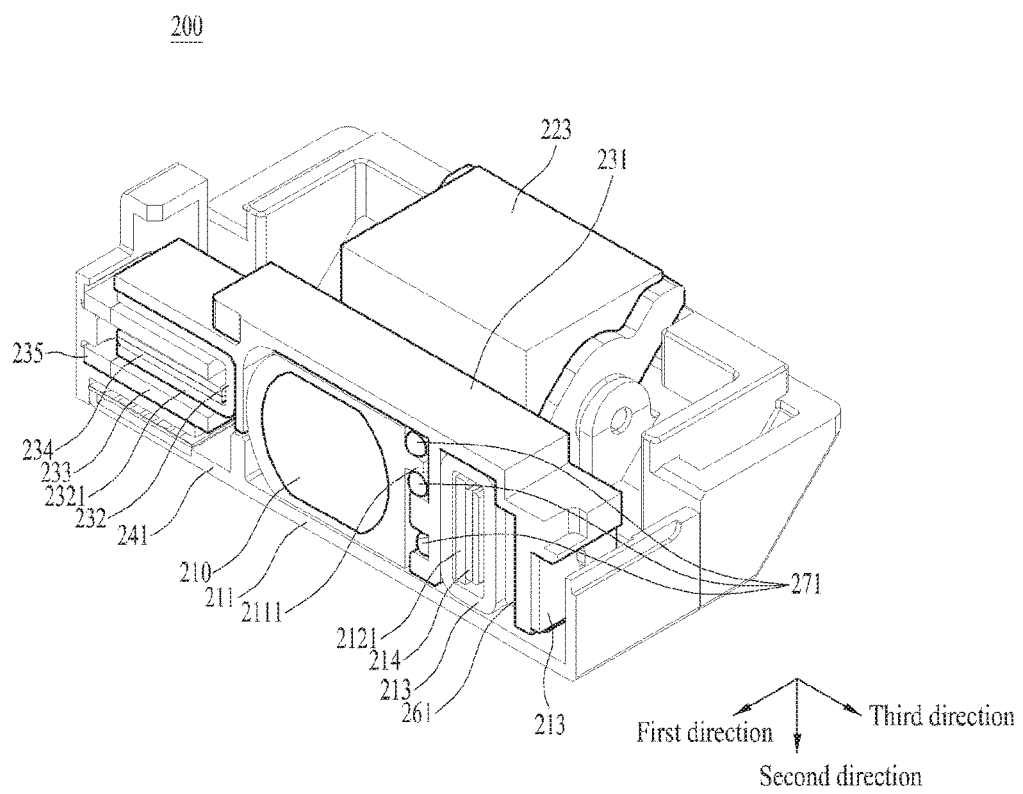
FIG. 11 is a cross-sectional view taken along line B-B' in FIG. 8.

FIG. 10 is a cross-sectional view taken along line A-A' in FIG. 8, and FIG. 11 is a cross-sectional view taken along line B-B' in FIG. 8.

The lens case 211 is fixed to the first steel plate 212. One end of the first steel plate 212 fixes the lens case 211, and the opposite end of the first steel plate 212 is provided with a first insertion portion 2121, which extends into a focusing-driving coil 213 for the movement of the lens case 211 in the first direction. The first insertion portion 2121 extends in the first direction, which is parallel to the direction of the optical axis 2101 of the refractive unit 210.

The first insertion portion 2121 forms a region on which a focusing-driving magnet 214 is seated so as to be coupled with the focusing-driving magnet 214.

The focusing-driving magnet 214 and the first insertion portion 2121 move in the first direction within the focusing-driving coil 213. At least a portion of the focusing-driving magnet 214 is inserted into the focusing-driving coil 213, and the focusing-driving magnet 214 and the focusing-driving coil 213 generate attractive force or repulsive force therebetween due to first current applied to the focusing-driving coil 213.

The force generated between the focusing-driving magnet 214 and the focusing-driving coil 213 due to the application of the first current acts as driving force for performing auto-focusing by moving the refractive unit 210 to a first relative location in the first direction (refer to FIG. 7).

A first flexible PCB 251 transmits the first current applied thereto to the focusing-driving coil 213. The first flexible PCB 251 is coupled to the outer wall of the compensatory case 231 so as to be electrically connected to the focusing-driving coil 213. The compensatory case 231 includes a conductive portion for electrically connecting the first flexible PCB 251 and the focusing-driving coil 213 to each other.

The focusing-driving magnet 214 and the first insertion portion 2121 are spaced a predetermined distance apart from the inner circumferential surface of the focusing-driving coil 213 so that the driving force is not deteriorated due to interference therebetween.

The length of the focusing-driving magnet 214 in the first direction and the length of the focusing-driving coil 213 in the first direction are set so that the focusing-driving magnet 214 and the focusing-driving coil 213 interact sufficiently with each other, and consequently sufficient driving force is generated.

The focusing-driving magnet 214 and the focusing-driving coil 213 may be provided at a portion of the lens case 211 in the lateral direction, i.e. the third direction. If the focusing-driving magnet 214 and the focusing-driving coil 213 are provided at a portion of the lens case 211 in the forward direction or the backward direction, i.e. the first direction, it may cause an unnecessary increase in volume in order to avoid interference in the optical path. If the focusing-driving magnet 214 and the focusing-driving coil 213 are provided at a portion of the lens case 211 in the upward direction or the downward direction, i.e. the second direction, it may cause an increase in the thickness of the camera module 200 in the vertical direction. As a result, it is desirable for the focusing-driving magnet 214 and the focusing-driving coil 213 to be provided at a portion of the lens case 211 in the third direction.

The focusing-driving magnet 214 and the focusing-driving coil 213, which are provided at a portion of the lens case 211 in the third direction, may be formed to have a cross-section that is elongated in the second direction. That is, it is possible to minimize an increase in the thickness in the third direction due to the focusing-driving magnet 214 and the focusing-driving coil 213.

The lengths of the focusing-driving magnet 214 and the focusing-driving coil 213 in the second direction are formed as long as possible so as to sufficiently correspond to the vertical thickness of the lens case 211 and consequently to provide sufficient driving force.

The focusing-driving coil 213 and the lens case 211 are mounted to the compensatory case 231. In particular, the respective components are fixed to the compensatory case 231 so as to perform the same movement as the compensatory case 231.

The lens case 211 supports the compensatory case 231 and performs relative translational movement in the first direction. Specifically, the lens case 211 supports the compensatory case 231 via bearing balls 271 and magnetic elements.

The magnetic elements serve to generate attractive force between the lens case 211 and the compensatory case 231 so that the lens case 211 securely supports the compensatory case 231. The bearing balls 271 serve to reduce frictional force, which is generated when the lens case 211 performs translational movement due to the driving force of the focusing-driving coil 213 and the focusing-driving magnet 214 while supporting the compensatory case 231.

Each of the lens case 211 and the compensatory case 231 may include a respective one of the magnetic elements to generate attractive force therebetween. The lens case 211 may support only the compensatory case 231 against the force of gravity due to the attractive force generated by the magnetic elements.

The focusing-driving magnet may also serve as a magnetic element as needed. Configuration may be made such that the focusing-driving magnet and a first magnetic element 261 provided in the compensatory case 231 generate attractive force therebetween. The first magnetic element 261, which is made of a magnetic material, may be bonded to the compensatory case 231, which is made of a non-magnetic material.

The bearing balls 271 minimize frictional force between the lens case 211 and the compensatory case 231, which may be generated during the translational movement of the lens case 211 in the first direction.

The lens case 211 may include three bearing balls 271 to support the compensatory case 231. Specifically, in the direction perpendicular to the first direction, two bearing balls 271 are disposed in the upper end portion of the lens case 211, and one bearing ball 271 is disposed in the lower end portion of the lens case 211.

Figure 12:
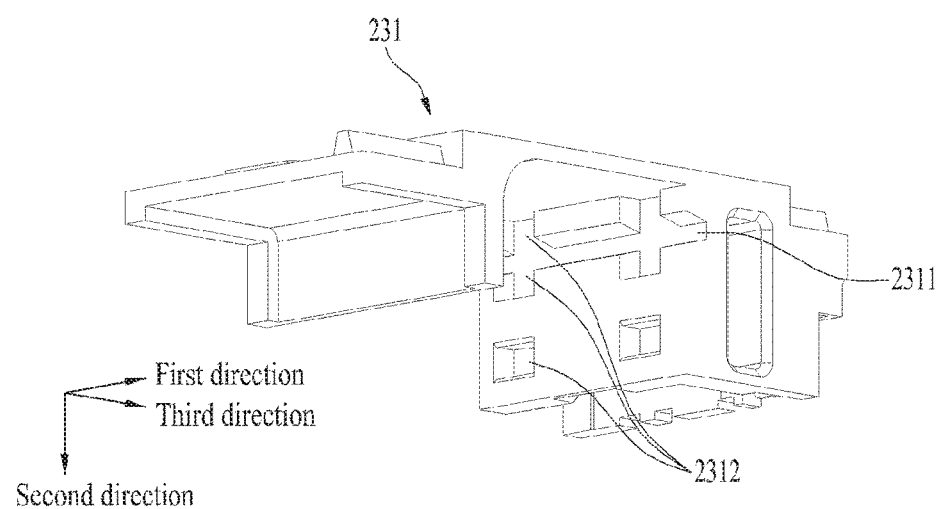
FIG. 12 illustrates a top perspective view of a lens case and a bottom perspective view of a compensatory case.
Figure 12:
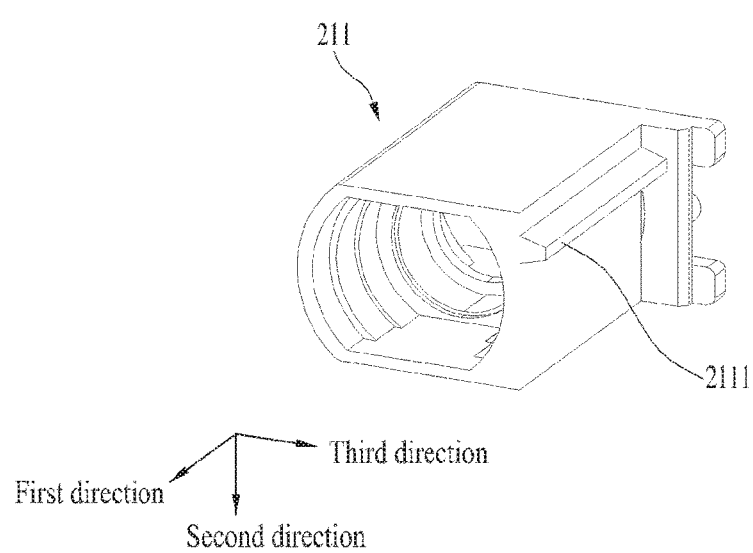

FIG. 12 illustrates a top perspective view of the lens case 211 and a bottom perspective view of the compensatory case 231.

For convenience of explanation, a description will be made with reference to FIG. 11 as well as FIG. 12.

The lens case 211 includes a support rib 2111, which protrudes from one surface thereof to support the bearing balls 271. The support rib 2111 may be disposed between the bearing balls 271 so as to contact the same.

Specifically, the support rib 2111 may have a V-shaped cross-section, and may protrude toward one surface of the compensatory case 231. One inclined surface of the support rib 2111 may support one of the two upper bearing balls 271, and the other inclined surface of the support rib 2111 may support the other one of the two upper bearing balls 271.

The lens case 211 and the compensatory case 231 are supported by each of the bearing balls 271 in a three-point contact manner due to the V-shaped support rib 2111. That is, the compensatory case 231 is supported by each of the bearing balls 271 such that the inner surface of the compensatory case 231 and each of the bearing balls 271 contact each other at two points therebetween, and the support rib 2111 is supported by each of the bearing balls 271 such that the support rib 2111 and each of the bearing balls 271 contact each other at one point therebetween. In this manner, a stable structure may be ensured. This three-point support structure prevents undesirable movement of the lens case 211 and the compensatory case 231.

In addition, since one support rib 2111 supports two bearing balls 271, the lens case 211 and the compensatory case 231 may be securely supported without being affected by manufacturing tolerances of the respective components.

A plurality of sets of the three bearing balls 271 may be arranged in the first direction. For example, six bearing balls 271 may be provided such that two sets of the bearing balls, each set including three bearing balls arranged in the vertical direction, are arranged in the first direction.

The compensatory case 231 has therein a rib groove 2311, into which the support rib 2111 of the lens case 211 is inserted.

The compensatory case 231 further has therein ball-seating portions 2312, in which the bearing balls 271 are seated.

The compensatory case 231 covers at least one of the top surface or the lateral surface of the lens case 211 so as to prevent separation of the bearing balls provided between the compensatory case 231 and the lens case 211. Portions of the compensatory case 231 and the lens case 211 other than the portions at which the bearing balls 271 are provided are spaced a predetermined distance apart from each other in order to prevent frictional force from disturbing the movement of the refractive unit 210.

Although it is illustrated that the support rib 2111 is formed at the lens case 211 and the ball-seating portions 2312 are formed at the compensatory case 231, the support rib 2111 may be formed at the compensatory case 231 and the ball-seating portions 2312 may be formed at the lens case 211.

Referring to FIG. 10 again, a focusing-sensing coil 215 may be disposed adjacent to and in alignment with an end of the focusing-driving coil 213. This maximizes the effect of inducing an electromagnetic field to the focusing-sensing coil 215. The focus-sensing coil 215 generates second current in accordance with the first relative displacement of the lens case 211 to the compensatory case 231.

The focusing-sensing coil 215 maintains a predetermined fixed distance from the focusing-driving coil 213. As an extreme example, the focusing-sensing coil 215 and the focusing-driving coil 213 may be in contact with each other.

The first insertion portion 2121 is displaced within the focusing-driving coil 213 in accordance with the first relative displacement of the lens case 211, and changes the inductance. Second current is electromagnetically induced to the focusing-sensing coil 215 due to the change in the inductance.

The generated second current varies depending on the first relative displacement and the displacement direction of the lens case 211. Therefore, it is possible to calculate the first relative displacement by analyzing the value of the second current.

Unlike the prior art, in which the relative distance between a driving coil and a sensing coil varies, the present invention is characterized in that electromagnetic induction is realized in the state in which the relative distance between the driving coil and the sensing coil is fixed.

The focusing-sensing coil 215 is connected to a second flexible PCB 252, and transmits the generated second current to the controller via the second flexible PCB 252. The focusing-sensing coil 215 may also be electrically connected to the second flexible PCB 252 via the conductive portion of the compensatory case 231.

The second flexible PCB 252 and the first flexible PCB 251 may include the same PCB in common.

Figure 13:
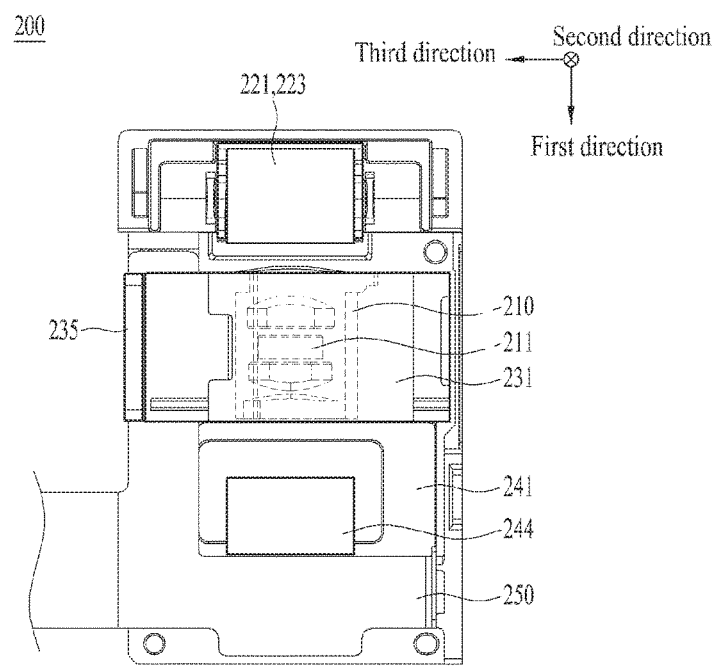
FIG. 13 illustrates a portion of the top surface of the camera module according to the present invention.
Figure 13:
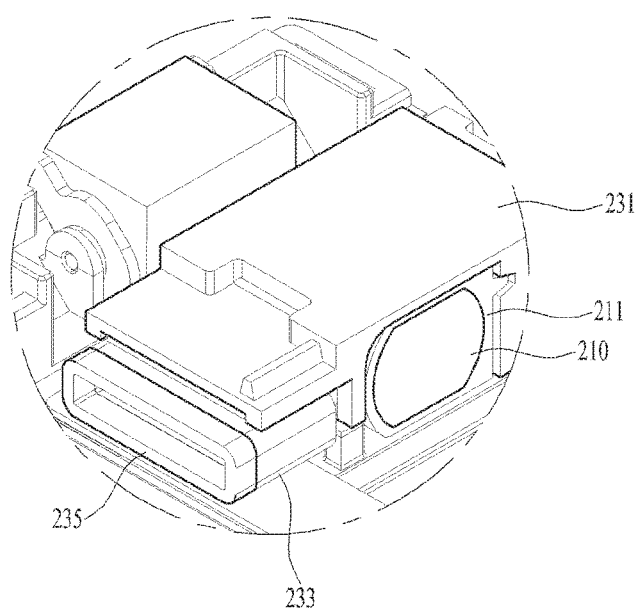

FIG. 13 illustrates a portion of the top surface of the camera module 200 according to the present invention.

The compensatory case 231 is configured to perform translational movement in the third direction relative to a fixed case 241. The fixed case 241 forms at least a portion of the external appearance of the camera module 200. Therefore, shaking of the fixed case 241 and shaking of the camera module 200 may be considered equivalent to each other.

The refractive unit 210 moves relative to the fixed case 241 due to the movement of the compensatory case 231 relative to the fixed case 241. Therefore, the translational movement of the compensatory case 231 in the third direction relative to the fixed case 241 serves to compensate for the rotation of the camera module 200 in the horizontal direction (refer to FIG. 6).

That is, the driving mechanism for auto-focusing directly moves the lens case 211, and the driving mechanism for shaking compensation indirectly moves the lens case 211 by moving the compensatory case 231.

Since the direction in which the lens case 211 moves for auto-focusing and the direction in which the lens case 211 and the compensatory case 231 move for shaking compensation are perpendicular to each other, the respective types of movement do not have an influence on each other and function independently. That is, in the auto-focusing, the refractive unit 210 moves only in the first direction. In the shaking compensation, the refractive unit 210 moves only in the third direction, which is perpendicular to the first direction. Therefore, the movement of the compensatory case 231 in the third direction does not have an influence on auto-focusing performance.

The principle whereby the compensatory case 231 moves relative to the fixed case 241 is equivalent to the above-described principle whereby the lens case 211 moves relative to the compensatory case 231.

Figure 14:
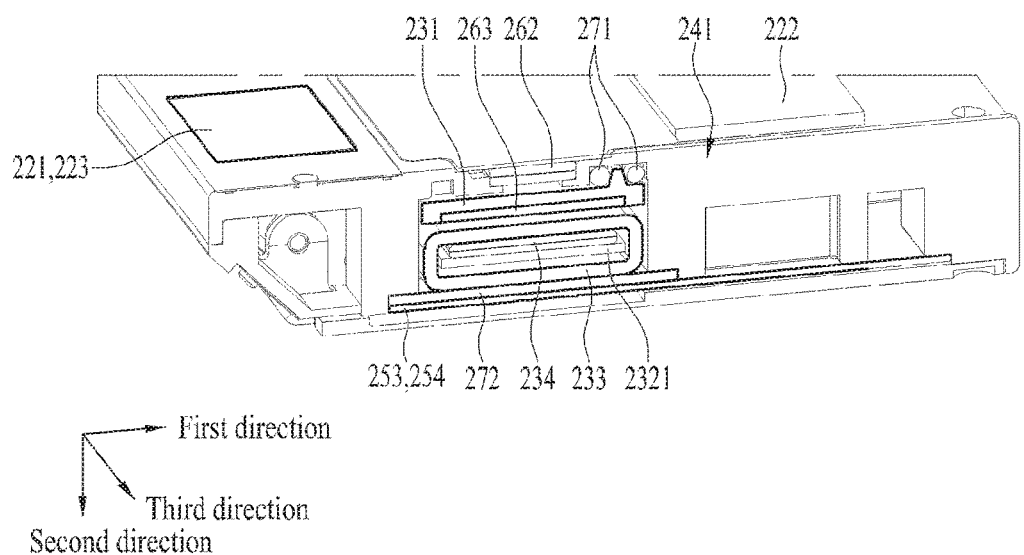
FIG. 14 is a cross-sectional view taken along line C-C' in FIG. 8.

FIG. 14 is a cross-sectional view taken along line C-C' in FIG. 8.

For convenience of explanation, a description will be made with reference to FIG. 11 as well as FIG. 14.

A translational-movement-driving coil 233 is provided at the fixed case 241, and a translational-movement-driving magnet 234 is fixedly provided at the compensatory case 231.

When third current is applied to the translational-movement-driving coil 233, driving force for moving the translational-movement-driving magnet 234 to a second relative location in the third direction is generated. The generated driving force consequently allows the compensatory case 231 to perform translational movement relative to the fixed case 241.

The compensatory case 231 is fixed to one side of a second steel plate 232, and the translational-movement-driving magnet 234 is fixed to the opposite side of the second steel plate 232. At least a portion of the translational-movement-driving magnet 234 is seated on a second insertion portion 2321, which protrudes from the opposite side of the second steel plate 232, and is inserted into the translational-movement-driving coil 233. The second insertion portion 2321 may be formed in the third direction.

It is preferable for the focusing-driving coil 213 and the translational-movement-driving coil 233 to be arranged perpendicular to each other so that movement of the lens case 211 in the first direction for auto-focusing and movement of the compensatory case 231 and the lens case 211 in the third direction for optical image stabilization do not interfere with each other.

The translational-movement-sensing coil 235 measures the second relative displacement of the compensatory case 231 in the third direction, relative to the fixed case 241.

The principle of measuring the second relative displacement of the translational-movement-sensing coil 235 is the same as the principle of measuring the first relative displacement of the lens case 211 via the focusing-sensing coil 215. Fourth current that corresponds to the second relative displacement of the compensatory case 231 is electromagnetically induced to the translational-movement-sensing coil 235.

The translational-movement-sensing coil 235 and the translational-movement-driving coil 233 may be arranged in series with each other. Since both the translational-movement-sensing coil 235 and the translational-movement-driving coil 233 are fixedly mounted to the fixed case 241, the relative distance therebetween does not change in spite of the movement of the compensatory case 231.

Similar to the first flexible PCB and the second flexible PCB 252, a third flexible PCB 253 may be electrically connected to the translational-movement-driving coil 233, and a fourth flexible PCB 254 may be electrically connected to the translational-movement-sensing coil 235. The third current is applied to the translational-movement-driving coil 233 via the third flexible PCB 253, and the fourth current generated by the translational-movement-sensing coil 235 is transferred to the controller 180 (refer to FIG. 2) via the fourth flexible PCB 254.

These components may be connected to each other via a conductive portion 272 provided in the fixed case 241.

As described above, the compensatory case 231 performs translational movement in the third direction while being supported by the fixed case 241. The compensatory case 231 is supported by the fixed case 241 via the bearing balls 271. The bearing balls 271 provided between the compensatory case 231 and the fixed case 241 minimize frictional force that is generated during the movement of the compensatory case 231 in the third direction.

The aforementioned support rib 2111 is formed between the compensatory case 231 and the fixed case 241, and the arrangement of the bearing balls 271 is the same as that described above. A duplicated explanation thereof will thus be omitted.

A portion of the compensatory case 231 is supported by the fixed case 241 via only the bearing balls 271, and the remaining portion thereof is spaced apart from the fixed case 241. Therefore, it is possible to minimize frictional force that is generated between the compensatory case 231 and the fixed case 241.

In order to maintain the separated state between the compensatory case 231 and the fixed case 241, each of magnetic elements 260 that generate attractive force therebetween may be provided at a respective one of the surface of the compensatory case 231 and the surface of the fixed case 241 that face each other. The compensatory case 231 may be supported by the fixed case 241 against the force of gravity due to the attractive force generated by the magnetic elements 260.

The magnetic elements 260 may include a second magnetic element 262 provided at the fixed case 241 and a third magnetic element 263 provided at the compensatory case 231. The second magnetic element 262 and the third magnetic element 263 may generate attractive force therebetween.

The third magnetic element 263 may be configured as a steel plate. If the second magnetic element 262 includes a magnetic material, the steel plate and the magnetic material may generate attractive force therebetween.

Figure 15:
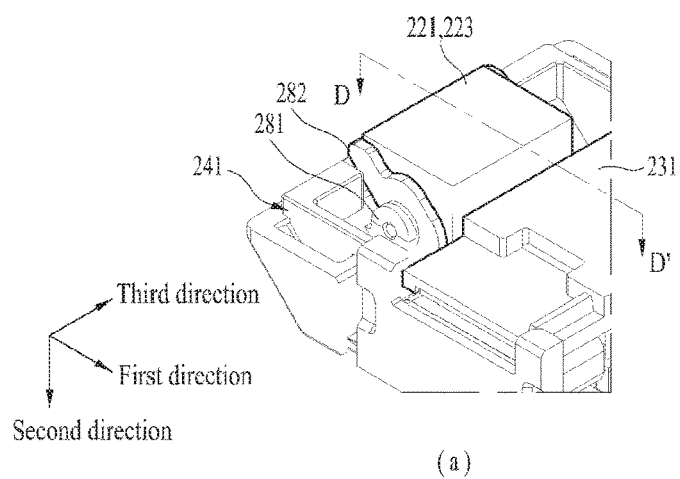
FIG. 15 is several views showing the camera module according to the present invention.
Figure 15:
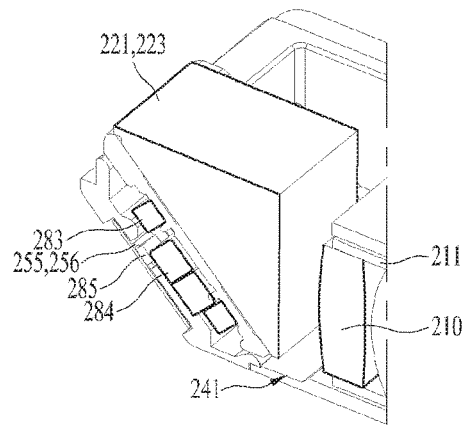
Figure 15:
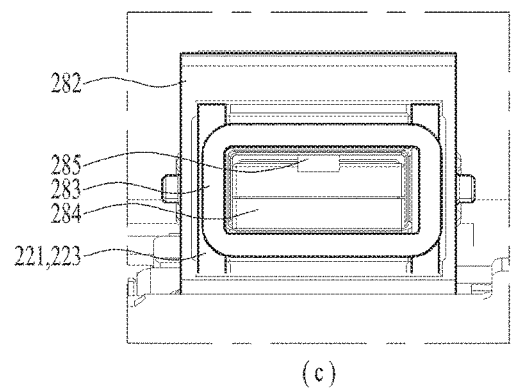

FIG. 15*a* is a perspective view showing the cross-section of the first reflective unit 223 of the camera module 200 according to the present invention, FIG. 15*b* is a cross-sectional view taken along line D-D' in FIG. 15*a*, and FIG. 15*c* is a view showing the rear surface of a portion of the first reflective unit 223 of the camera module 200 according to the present invention.

A rotary portion 281 is fixedly provided at the fixed case 241. The rotary portion 281 has a rotary axis in the third direction and is rotatably coupled to the first reflective unit 223. That is, the rotary portion 281 allows the first reflective unit 223 to rotate about the rotary axis of the rotary portion 281, which is oriented in the third direction. The first reflective unit 223 may be directly rotatably coupled to the rotary portion 281. Alternatively, the first reflective unit 223 may be coupled to a reflective unit case, and a prism case 282 may be directly rotatably coupled to the rotary portion 281.

A rotation-driving magnet 284 is fixedly provided at the first reflective unit 223. The rotation-driving magnet 284 interacts with a rotation-driving coil 283 provided at the fixed case 241 to generate electromagnetic force, and thus moves relative to the fixed case 241. That is, the first reflective unit 223 rotates about the rotary axis of the rotary portion 281.

The controller 180 (refer to FIG. 2) senses rotational shaking of the device in the first plane thereof and applies fifth current to the rotation-driving coil 283 in response to the rotational shaking sensing value. The rotation-driving coil 283, to which the fifth current is applied, forms a magnetic field and generates attractive force or repulsive force together with the rotation-driving magnet 284.

The rotation-driving magnet 284 has an N-pole and an S-pole. Therefore, torque for rotation about the rotary axis oriented in the third direction is generated by interaction of the electromagnetic force generated by the fifth current applied to the rotation-driving coil 283 with the respective poles of the rotation-driving magnet.

A hall IC 285 is fixedly provided at the fixed case 241 and senses the extent of rotation of the first reflective unit 223. Specifically, the hall IC 285 generates a relative magnetic field signal to the rotation-driving magnet 284, which is coupled to the first reflective unit 223 and rotates, thereby generating a signal indicating the extent of rotation of the first reflective unit 223.

The controller 180 (refer to FIG. 2) determines the rotational state of the first reflective unit 223 by analyzing the value of sixth current generated via the hall IC 285, and calculates the fifth current based on the value of shaking of the device and the determined rotational state of the first reflective unit 223.

A fifth flexible PCB 255 is electrically connected to the rotation-driving coil 283 via the conductive portion 272 of the fixed case 241. A sixth flexible PCB 256 is connected to the hall IC 285 via the conductive portion 272 of the fixed case 241. The fifth flexible PCB 255 receives the fifth current and applies the same to the rotation-driving coil 283. The sixth flexible PCB 256 transmits the sixth current generated by the hall IC 285 to the controller 180 (refer to FIG. 2).

All of the first flexible PCB to the sixth flexible PCB 256 may be provided at a single flexible PCB 250. That is, the first to sixth flexible PCBs may be branched off from the PCB 250 to be connected to the respective components, and the PCB 250 may have conductive patterns respectively suitable for the first to sixth flexible PCBs.

When the camera module 200 is connected to the camera device 100, the flexible PCB may be electrically connected to the controller 180 (refer to FIG. 2) of the camera device 100. The controller 180 (refer to FIG. 2) may exchange first to sixth currents with the camera module 200 via the flexible PCB 250.

Figure 16:
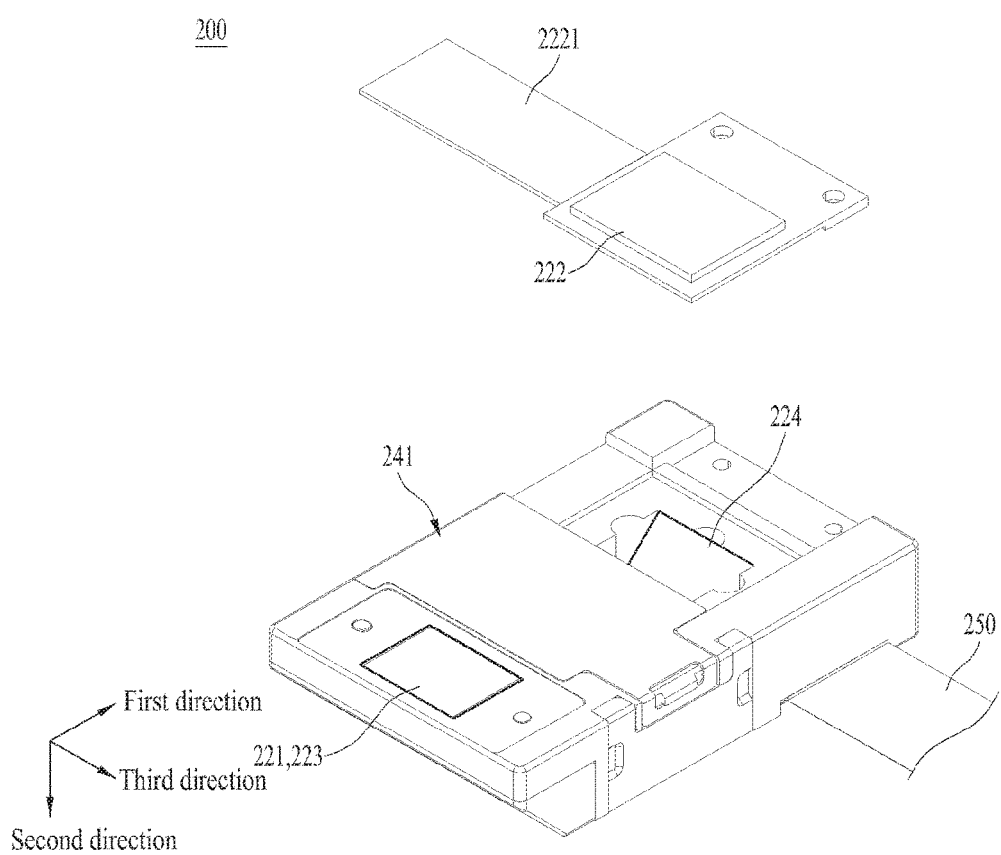
FIG. 16 is a top perspective view of the camera module according to the present invention.

FIG. 16 is a top perspective view of the camera module 200 according to the present invention.

The image sensor 222 converts the light, which is reflected from a subject and is transmitted to the image sensor 222 to form an image via the refractive unit 210, into a signal related to the image. The image sensor 222 may be arranged such that a sensing surface thereof is perpendicular to the optical axis 2101 of the refractive unit 210. Alternatively, as shown in FIG. 16, the image sensor 222 may be located at a position that is oriented from the second reflective unit 224 in the direction opposite the second direction, and may be arranged such that the sensing surface thereof is perpendicular to the second direction, to thereby minimize the thickness of the device in the second direction.

The second reflective unit 224 is provided in the optical path between the refractive unit 210 and the image sensor 222 so as to reflect the light that has passed through the refractive unit 210 to the image sensor 222. That is, the second reflective unit 224 serves to reflect the light, introduced thereinto in the first direction, in the direction opposite the second direction. The second reflective unit 224 may be formed of a material having a light-reflective property, for example, silver, aluminum, etc. This material may be applied only to a reflective surface of the second reflective unit 224, thereby reducing manufacturing costs.

Figure 17:
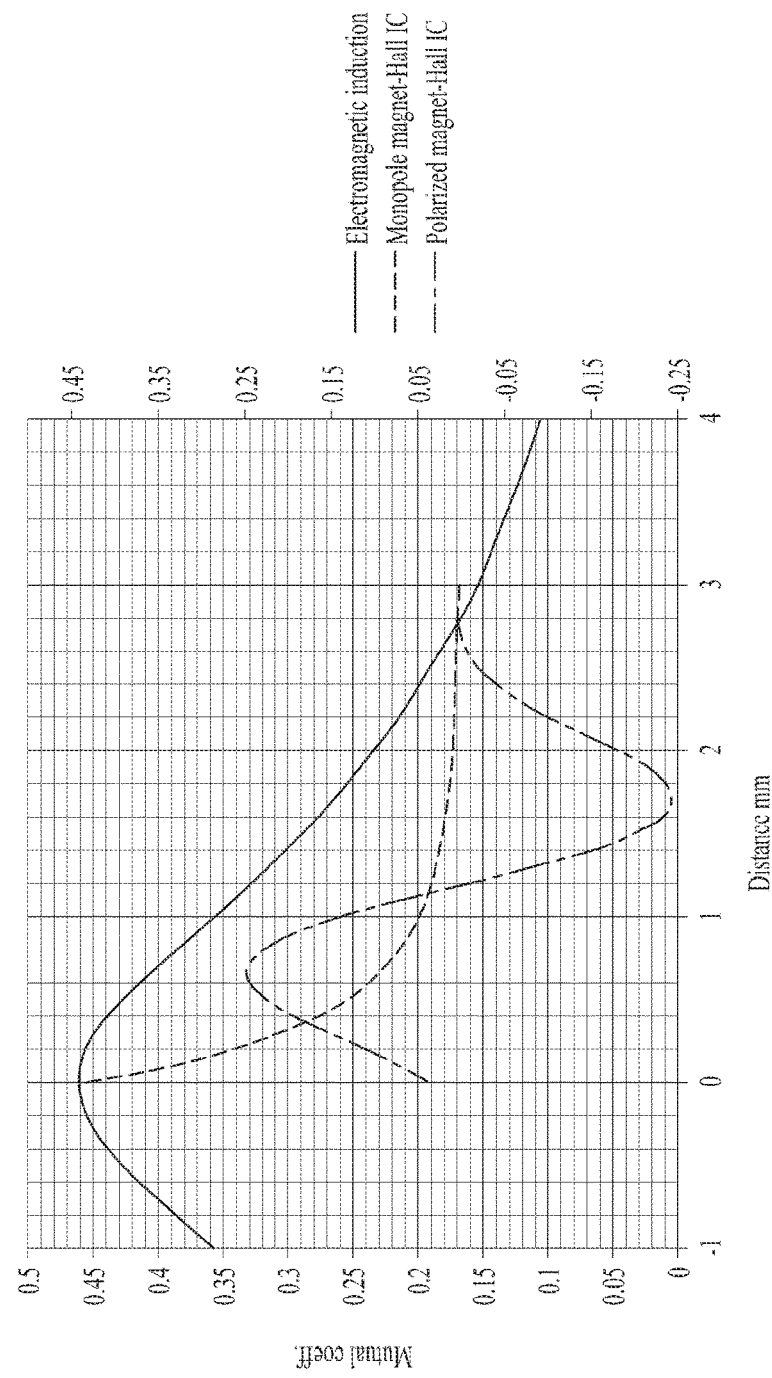
FIG. 17 is a graph showing comparisons between values measured by various displacement-sensing methods.

FIG. 17 is a graph showing comparisons between values measured by various displacement-sensing methods.

When sensing is performed via the hall IC 285 using a polarized magnet, an output signal has linearity with respect to a displacement ranging from about 0.8 mm to about 1.6 mm. When sensing is performed via the hall IC 285 using a monopole magnet, an output signal decreases within the displacement range from about 0 mm to about 3 mm. However, in this case, because the inclination changes sharply at a displacement of about 0.6 mm, it is difficult to ensure linearity over the entire displacement range. The electromagnetic induction method exhibits linearity continually from a displacement of about 0 mm. Therefore, the electromagnetic induction method is capable of measuring the displacement relatively accurately. Therefore, displacement measurement using the sensing coil provided by the present invention is highly accurate over a relatively wide range of movement.

It is difficult to apply the sensing method using the hall IC 285 to long-range auto-focusing, in which the driving distance required for auto-focusing is 450 μm or more. Therefore, the sensing method via the sensing coil of the present invention may be applied more effectively to long-range auto-focusing.

While the hall IC 285 detects only variation in the position of a point at which a moving object is located, the electromagnetic induction method is capable of measuring average variation in the position, which has conceptually a certain area, rather than variation in the position of a point. Therefore, the electromagnetic induction method has higher usability.

As is apparent from the above description, the camera module and the camera device according to the present invention have the following effects.

According to at least one of the embodiments of the present invention, it is possible to minimize the thickness of the camera module and the camera device.

In addition, according to at least one of the embodiments of the present invention, it is possible to increase the freedom of design of a lens while minimizing the thickness of the camera module and the camera device.

In addition, according to at least one of the embodiments of the present invention, it is possible to increase accuracy of sensing of the degree of movement of the refractive unit.

In addition, according to at least one of the embodiments of the present invention, it is possible to minimize frictional force that is generated during movement for auto-focusing or handshake compensation.

In addition, according to at least one of the embodiments of the present invention, it is possible to ensure stability in the movement structure for auto-focusing or handshake compensation.

In addition, according to at least one of the embodiments of the present invention, it is possible to generate attractive force between components with a simple structure.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A camera module comprising:
   a refractive unit comprising at least one lens, the lens having an optical axis oriented in a first direction;
   a lens case configured to support the refractive unit mounted thereto;
   a focusing-driving magnet secured to the lens case;
   a focusing-driving coil configured to accommodate at least a portion of the focusing-driving magnet inserted thereinto, the focusing-driving coil receiving first current and generating driving force for allowing the focusing-driving magnet to perform first relative displacement in the first direction;
   a compensatory case configured to support the focusing-driving coil fixedly mounted thereto; and
   a focusing-sensing coil fixedly provided in the compensatory case, wherein second current is electromagnetically induced at the focusing-sensing coil by the first relative displacement.

2. The camera module according to claim 1, further comprising:
   a first steel plate having one end that is secured to the lens case; and
   a first insertion portion provided at an opposite end of the first steel plate in the first direction so as to be coupled to the focusing-driving magnet, at least a portion of the first insertion portion being inserted into the focusing-driving coil.

3. The camera module according to claim 2, wherein the focusing-driving coil and the focusing-sensing coil are arranged in series with each other.

4. The camera module according to claim 1, further comprising:
   a first magnetic portion provided in the lens case and the compensatory case in order to generate attractive force between the lens case and the compensatory case; and at least one bearing ball provided between the lens case and the compensatory case in order to support the lens case and the compensatory case.

5. The camera module according to claim 4, wherein the at least one bearing ball comprises a plurality of bearing balls, and
the camera module further comprises:
a ball-seating portion formed concavely in a first surface of one of the lens case and the compensatory case in order to accommodate the plurality of bearing balls therein; and
a support rib protruding from a second surface of a remaining one of the lens case and the compensatory case in order to support the bearing balls.

6. The camera module according to claim 5, wherein the support rib has a V-shaped cross-section and protrudes toward the first surface.

7. The camera module according to claim 1, further comprising:
a first reflective unit configured to reflect light introduced thereinto in a second direction to the refractive unit;
a translational-movement-driving magnet secured to the compensatory case;
a translational-movement-driving coil configured to accommodate at least a portion of the translational-movement-driving magnet inserted thereinto, the translational-movement-driving coil receiving third current and generating driving force for allowing the translational-movement-driving magnet to perform second relative displacement in a third direction;
a fixed case configured to support the translational-movement-driving coil fixedly mounted thereto; and
a translational-movement-sensing coil fixedly provided in the fixed case, wherein fourth current is electromagnetically induced at the translational-movement-sensing coil by the second relative displacement,
wherein the third direction is perpendicular to both the first direction and the second direction.

8. The camera module according to claim 7, further comprising:
a second magnetic portion provided at the fixed case;
a third magnetic portion provided at the compensatory case to generate attractive force with the second magnetic portion; and
at least one bearing ball provided between the compensatory case and the fixed case in order to support the compensatory case and the fixed case.

9. The camera module according to claim 7, further comprising:
a rotary portion fixedly provided at the fixed case and rotatably coupled to the first reflective unit, the rotary portion having a rotary axis oriented in the third direction;
a rotation-driving magnet fixedly provided at the first reflective unit; and
a rotation-driving coil provided at the fixed case so as to correspond to the rotation-driving magnet, the rotation-driving coil receiving fifth current and generating driving force for rotating the first reflective unit about the rotary axis of the rotary portion.

10. The camera module according to claim 9, further comprising:
a hall integrated circuit (IC) fixedly provided at the fixed case so as to correspond to the rotation-driving magnet, the hall IC generating sixth current by sensing an extent of rotation of the first reflective unit.

11. The camera module according to claim 7, wherein the first reflective unit is a prism having a light-incident surface that is perpendicular to the second direction and a light-reflective surface for reflecting light, introduced in the second direction, in the first direction.

12. The camera module according to claim 1, further comprising:
a second reflective unit configured to reflect light, having passed through the refractive unit in the first direction, in a direction opposite the second direction; and
an image sensor located at a position that is oriented from the second reflective unit in the direction opposite the second direction, the image sensor being arranged such that a sensing surface thereof is perpendicular to the second direction.

13. A camera device comprising a front surface and a rear surface arranged in a thickness direction and a camera module mounted thereto, wherein
the camera module comprises:
a refractive unit comprising at least one lens, the lens having an optical axis oriented in a first direction;
a lens case configured to support the refractive unit mounted thereto;
a focusing-driving magnet secured to the lens case;
a focusing-driving coil configured to accommodate at least a portion of the focusing-driving magnet inserted thereinto, the focusing-driving coil receiving first current and generating driving force for allowing the focusing-driving magnet to perform first relative displacement in the first direction;
a compensatory case configured to support the focusing-driving coil fixedly mounted thereto;
a focusing-sensing coil fixedly provided in the compensatory case, wherein second current is electromagnetically induced at the focusing-sensing coil by the first relative displacement;
a first reflective unit configured to reflect light introduced thereinto in a second direction to the refractive unit;
a second reflective unit configured to reflect light, having passed through the refractive unit in the first direction, in a direction opposite the second direction; and
an image sensor located at a position that is oriented from the second reflective unit in the direction opposite the second direction, the image sensor being arranged such that a sensing surface thereof is perpendicular to the second direction, and
wherein the second direction is identical to the thickness direction of the camera device.

14. The camera device according to claim 13, wherein the camera module further comprises:
a translational-movement-driving magnet secured to the compensatory case;
a translational-movement-driving coil configured to accommodate at least a portion of the translational-movement-driving magnet inserted thereinto, the translational-movement-driving coil receiving third current and generating driving force for allowing the translational-movement-driving magnet to perform second relative displacement in a third direction;
a fixed case configured to support the translational-movement-driving coil fixedly mounted thereto; and
a translational-movement-sensing coil fixedly provided in the fixed case, wherein fourth current is electromagnetically induced at the translational-movement-sensing coil by the second relative displacement,
wherein the third direction is perpendicular to both the first direction and the second direction, and wherein the camera device further comprises:
- a housing forming an external appearance of the camera device and configured to support the camera module such that the fixed case is fixed thereto; and
- a controller configured to apply the third current to the translational-movement-driving coil in response to shaking of the fixed case and a value of the fourth current.

15. The camera device according to claim 14, wherein the camera module further comprises:
- a rotary portion fixedly provided at the fixed case and rotatably coupled to the first reflective unit, the rotary portion having a rotary axis oriented in the third direction;
- a rotation-driving magnet fixedly provided at the first reflective unit;
- a rotation-driving coil provided at the fixed case so as to correspond to the rotation-driving magnet, the rotation-driving coil receiving fifth current and generating driving force for rotating the first reflective unit about the rotary axis of the rotary portion; and
- a hall integrated circuit (IC) fixedly provided at the fixed case so as to correspond to the rotation-driving magnet, the hall IC sensing an extent of rotation of the first reflective unit and generating sixth current,
- wherein the controller applies the fifth current to the rotation-driving coil in response to shaking of the fixed case and a sensing value of the hall IC.

\* \* \* \* \*